Figure 1:
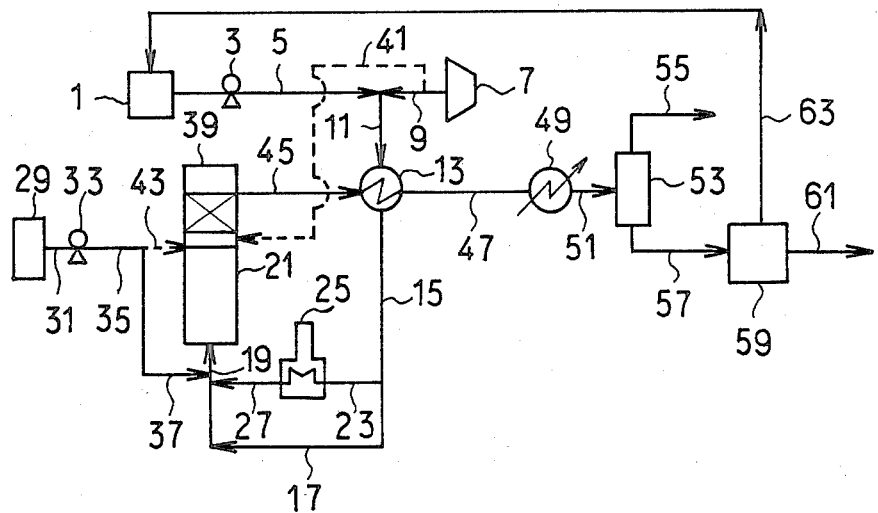

United States Patent [19]

Harada et al.

[11] Patent Number: 4,699,720
[45] Date of Patent: Oct. 13, 1987

[54] PROCESS FOR TREATING WASTE WATER BY WET OXIDATIONS

[75] Inventors: Yoshiaki Harada, Tsuzuki; Akio Nakashiba, Katano; Hiroyuki Matuura, Ibaraki; Teizou Okino, Amagasaki; Hajime Fujitani, Osaka; Kenichi Yamasaki, Gose; Yasuhumi Doi, Settsu; Shigenobu Yurugi, Osaka, all of Japan

[73] Assignee: Osaka Gas Company Limited, Osaka, Japan

[21] Appl. No.: 936,230

[22] Filed: Dec. 1, 1986

[30] Foreign Application Priority Data

Mar. 12, 1985 [JP] Japan .................. 60-272082
Apr. 12, 1985 [JP] Japan .................. 60-274192
Apr. 12, 1985 [JP] Japan .................. 60-274193
Apr. 12, 1985 [JP] Japan .................. 60-274194

[51] Int. Cl.$^4$ ............................ C02F 1/74
[52] U.S. Cl. ...................... 210/762; 210/763; 210/903

[58] Field of Search .............. 210/761–763, 210/766, 903

[56] References Cited

U.S. PATENT DOCUMENTS

| 2,690,425 | 9/1954 | Moses et al. | 210/762 |
| 4,018,568 | 4/1977 | Brewer | 210/763 X |
| 4,141,828 | 2/1979 | Okada et al. | 210/762 |
| 4,155,848 | 5/1979 | Sato et al. | 210/761 |
| 4,203,838 | 5/1980 | Shimizu et al. | 210/761 X |
| 4,294,706 | 10/1981 | Kakihara et al. | 210/762 |
| 4,604,215 | 8/1986 | McCorquodale | 210/762 |
| 4,654,149 | 3/1987 | Harada et al. | 210/763 |

Primary Examiner—Tom Wyse
Attorney, Agent, or Firm—Larson and Taylor

[57] ABSTRACT

Waste water containing at least two kinds of components among suspended solids, ammonia and chemically oxidizable substances is treated in a liquid phase oxidation in the presence of a catalyst supported by a carrier of honeycomb construction.

115 Claims, 7 Drawing Figures

PROCESS FOR TREATING WASTE WATER BY WET OXIDATIONS

INDUSTRIAL APPLICATION OF THE INVENTION

This invention relates to a process by which waste water containing at least two kinds of components among suspended solids, ammonia and chemically oxidizable substances (hereinafter referred to as "COD components") is subjected to a combination of wet oxidations.

PRIOR ART AND ITS PROBLEMS

For the control of water quality, it has been thought increasingly important in recent years to remove from waste water nitrogen components (particularly ammonia nitrogen) as well as COD components. In view of such situation, we conducted various experiments and extensive research and developed practical processes for treating waste water which are capable of decomposing the COD components and ammonia contained in the waste water for removal (Japanese Examined patent publications Nos. 42992/1981, 42391/1982, 33320/1982, 27999/1983, 19757/1984, 29317/1984 and 49073/1984, U.S. Pat. Nos. 4141828 and 4294706, etc.). However, when waste water to be treated contains suspended solids in a concentration of as high as about 500 ppm to tens of thousands ppm, the unreacted suspended solids tend to adhere to the components of treating apparatus, resulting in, for example, decreased heat transfer coefficient on the surface of the heat exchanger, and increased pressure loss and reduced activity of catalyst due to the deposition of solids on the surface of catalyst particles packed in the reactor. Accordingly it is necessary to remove suspended solids partly or wholly from the waste water prior to the treatment depending on the concentration and composition of the solids.

When waste water containing suspended solids in a high concentration is treated by the biological treatment process currently in wide use, the treatment is carried out after removing the major portion of suspended solids, or the solids are withdrawn after treatment as excess sludge from the treating apparatus and disposed by incineration, fusion, dumping into sea, landfill or the like or utilized as a fertilizer. The overall amount of sewage industrially and municipally produced from the treatment of waste water and the waste from sewage treatment plants is increasing year after year. To overcome this problem, it is desired to find out a measure for minimizing the amount of sludge produced or to be treated and to develop an effective method for treating with economical feasibility the sludge being continuously accumulated.

MEANS FOR SOLVING THE PROBLEMS

In view of the state of the art, we continued research efforts to improve the aforesaid prior inventions in an attempt to devise processes for treating waste water which are capable of simultaneously decomposing the suspended solids in a high concentration as well as the other components contained in the waste water. Our continued research has revealed that the object can be achieved by combining a liquid phase oxidation in the presence of a specific catalyst supported by a carrier of honeycomb construction with at least one liquid phase oxidation. This invention has been accomplished based on this finding.

This invention provides:

(I) a process for treating waste water by wet oxidations which contains at least two kinds of components among suspended solids, ammonia and COD components, the process comprising the steps of;

(i) subjecting waste water to liquid phase oxidation in the absence of a catalyst and in the presence of an oxygen-containing gas, and (ii) subjecting the water from the step (i) to liquid phase oxidation in the presence of an oxygen-containing gas and a catalyst supported by a carrier of honeycomb construction and comprising at least one of iron, cobalt, nickel, ruthenium, rhodium, palladium, iridium, platinum, copper, gold, tungsten and compounds thereof insoluble or sparingly soluble in water (hereinafter referred to as "process I"), (II) a process for treating waste water by wet oxidations which contains at least two kinds of components among suspended solids, ammonia and COD components, the process comprising the steps of;

(i) subjecting waste water to liquid phase oxidation in the absence of a catalyst and in the presence of an oxygen-containing gas, (ii) subjecting the water from the step (i) to liquid phase oxidation in the presence of an oxygen-containing gas and a catalyst supported by a carrier of honeycomb construction and comprising at least one of iron, cobalt, nickel, ruthenium, rhodium, palladium, iridium, platinum, copper, gold, tungsten and compounds thereof insoluble or sparingly soluble in water, and (iii) subjecting the water from the step (ii) to liquid phase oxidation in the presence of an oxygen-containing gas and a catalyst supported by a granular carrier and comprising at least one of iron, cobalt, nickel, ruthenium, rhodium, palladium, iridium, platinum, copper, gold, tungsten and compounds thereof insoluble or sparingly soluble in water (hereinafter referred to as "process II"), (III) a process for treating waste water by wet oxidations which contains at least two kinds of components among suspended solids, ammonia and COD components, the process comprising the steps of;

(i) subjecting waste water to liquid phase oxidation in the absence of a catalyst and in the presence of an oxygen-containing gas, (ii) subjecting the water from the step (i) to liquid phase oxidation in the presence of a honeycomb structure and an oxygen-containing gas, and (iii) subjecting the water from the step (ii) to liquid phase oxidation in the presence of an oxygen-containing gas and a catalyst supported by a carrier of honeycomb construction and comprising at least one of iron, cobalt, nickel, ruthenium, rhodium, palladium, iridium, platinum, copper, gold, tungsten and compounds thereof insoluble or sparingly soluble in water (hereinafter referred to as "process III"), (IV) a process for treating waste water by wet oxidations which contains at least two kinds of components among suspended solids, ammonia and COD components, the process comprising the steps of;

(i) subjecting waste water to liquid phase oxidation in the absence of a catalyst and in the presence of an oxygen-containing gas, (ii) subjecting the water from the step (i) to liquid phase oxidation in the presence of a honeycomb structure and an oxygen-containing gas, (iii) subjecting the water from the step (ii) to liquid phase oxidation in the presence of an oxygen-containing gas and a catalyst supported by a carrier of honeycomb construction and comprising at least one of iron, cobalt, nickel, ruthenium, rhodium, palladium, iridium, platinum, copper, gold, tungsten and compounds thereof insoluble or sparingly soluble in water, and (iv) subjecting the water from the step (iii) to liquid phase oxidation in the presence of an oxygen-containing gas and a catalyst supported by a granular carrier and comprising at least one of iron, cobalt, nickel, ruthenium, rhodium, palladium, iridium, platinum, copper, gold, tungsten and compounds thereof insoluble or sparingly soluble in water (hereinafter referred to as "process IV"), (V) a process for treating waste water by wet oxidations which contains at least two kinds of components among suspended solids, ammonia and COD components, the process comprising the steps of;

(i) subjecting waste water to liquid phase oxidation in the presence of a honeycomb structure and an oxygen-containing gas, and (ii) subjecting the water from the step (i) to liquid phase oxidation in the presence of an oxygen-containing gas and a catalyst supported by a carrier of honeycomb construction and comprising at least one of iron, cobalt, nickel, ruthenium, rhodium, palladium, iridium, platinum, copper, gold, tungsten and compounds thereof insoluble or sparingly soluble in water (hereinafter referred to as "process V"), (VI) a process for treating waste water by wet oxidations which contains at least two kinds of components among suspended solids, ammonia and COD components, the process comprising the steps of;

(i) subjecting waste water to liquid phase oxidation in the presence of a honeycomb structure and an oxygen-containing gas, (ii) subjecting the water from the step (i) to liquid phase oxidation in the presence of an oxygen-containing gas and a catalyst supported by a carrier of honeycomb construction and comprising at least one of iron, cobalt, nickel, ruthenium, rhodium, palladium, iridium, platinum, copper, gold, tungsten and compounds thereof insoluble or sparingly soluble in water, and (iii) subjecting the water from the step (ii) to liquid phase oxidation in the presence of an oxygen-containing gas and a catalyst supported by a granular carrier and comprising at least one of iron, cobalt, nickel, ruthenium, rhodium, palladium, iridium, platinum, copper, gold, tungsten and compounds thereof insoluble or sparingly soluble in water (hereinafter referred to as "process VI"), and (VII) a process for treating waste water by wet oxidations which contains at least two kinds of components among suspended solids, ammonia and COD components, the process comprising the steps of;

(i) subjecting waste water to liquid phase oxidation in the presence of an oxygen-containing gas and a catalyst supported by a carrier of honeycomb construction and comprising at least one of iron, cobalt, nickel, ruthenium, rhodium, palladium, iridium, platinum, copper, gold, tungsten and compounds thereof insoluble or sparingly soluble in water, and (ii) subjecting the water from the step (i) to liquid phase oxidation in the presence of an oxygen-containing gas and a catalyst supported by a granular carrier and comprising at least one of iron, cobalt, nickel, ruthenium, rhodium, palladium, iridium, platinum, copper, gold, tungsten and compounds thereof insoluble or sparingly soluble in water (hereinafter referred to as "process VII").

The ammonia contained in the waste water to be treated by the processes of the present invention includes ammonium compounds capable of forming ammonium ions when dissociated in water. The COD components present in the waste water to be treated in the present invention include phenols, cyanides, thiocyanides, oils, thiosulfuric acid, sulfurous acid, sulfides, nitrous acid, organic chlorine compounds (trichloroethylene, tetrachloroethylene, trichloroethane, methylene chloride, etc.) and the like. The term "suspended solids" used throughout the specification and the appended claims refers to the substances specified in JIS K 0102, suspended solids prescribed for the sewage test method by Japan Municipal Water Association and other combustible solids (e.g. sulfur).

The processes of the invention are suitable for treating waste water containing two or three kinds of the foregoing components (ammonia, suspended solids and COD components). Examples of such waste water are sewage sludge, concentrated liquid of sewage sludge, human waste, waste water resulting from desulfurization and from removal of cyanide, gas liquor from coal gasification and liquefaction processes, waste water from heavy oil gasification process, waste water produced in food processing plants, waste water produced in alcohol manufacturing plants, waste water discharged from chemical plants, etc. to which, however, the waste water to be treated by the processes of the invention is in no way limited.

The processes of the invention will be described below in detail.

(I) In the first step of the process I (hereinafter referred to as "step I-(i)"), the waste water to be treated is subjected to liquid phase oxidation in the presence of an oxygen-containing gas but without a catalyst. Examples of oxygen-containing gases are air, oxygen-enriched gases, oxygen and oxygen-containing waste gases such as those containing at least one of hydrogen cyanide, hydrogen sulfide, ammonia, sulfur oxides, organic sulfur compounds, nitrogen oxides, hydrocarbons, etc. The oxygen-containing gas is supplied in an amount corresponding to about 1 to about 1.5 times, preferably about 1.05 to about 1.2 times, the theoretical amount of oxygen required for the oxidation of the whole amounts of ammonia, suspended solids and COD components in the waste water (or in the waste water and waste gas) to nitrogen, carbon dioxide, water and the like. The use of an oxygen-containing waste gas as the source of oxygen is advantageous in that the harmful components in the gas can be rendered harmless along with those contained in the waste water. If the absolute amount of oxygen present in the oxygen-containing gas used is insufficient, the gas is replenished with oxygen by supplying air, oxygen-enriched air or oxygen per se. The oxygen-containing gas need not be fed wholly to the waste water in the step I-(i) and may be supplied as distributed to the steps I-(i) and the subsequent step. For example, the oxidation reaction in the step I-(i) can usually decompose about 10 to about 70% of suspended solids, about 10 to about 60% of COD components and 0 to about 15% of ammonia so that an oxygen-containing gas may be sent to the step I-(i) in an amount corresponding to about 0.4 to about 0.7 time the theoretical oxygen amount, leaving the remaining amount for further feed to the subsequent step. The reaction in the step I-(i) is carried out at a temperature of usually about 100° to about 370° C., preferably about 200° to about 300° C. With the increase in reaction temperature, oxygen content in the gas to be fed and reaction pressure, the decomposition efficiency of the components is raised, the residence time of waste water in the reactor is reduced, and the reaction conditions in the subsequent step is rendered moderate, but the installing cost rises. Accordingly the reaction temperature and other conditions are determined in view of the kind of waste water, reaction conditions of subsequent step, desired degree of treatment and overall operating and installing costs all combined. The reaction pressure is such that the waste water can at least retain its liquid phase at the predetermined temperature.

Subsequently in the second step of the process I (hereinafter referred to as "step I-(ii)"), the water from the step I-(i) is subjected again to liquid phase oxidation in the presence of a catalyst supported on a carrier having a honeycomb construction. Useful carriers of honeycomb construction can be any of those with cells having apertures in the form of quadrilateral, pentagon, hexagon or round. The honeycomb carrier is not specifically limited in properties but generally about 200 to about 800 m$^2$/m$^3$ in area per unit volume, about 40 to about 80% in aperture ratio, about 0.1 to about 100 m$^2$/g in specific surface, about 0.1 to about 0.4 cc/g in pore volume, and about 100 to about 5000 Å in mean pore size. Examples of materials for the carrier are titania, zirconia and the like. Such honeycomb structures are disclosed for example in Japanese Unexamined patent publications Nos. 106711/1978; 133592/1978; 57505/1979; 72788/1979; 132469/1979; and 140546/1980 incorporated by reference herein. Examples of active components of useful catalysts are iron, cobalt, nickel, ruthenium, rhodium, palladium, iridium, platinum, copper, gold, tungsten, and compounds thereof insoluble or sparingly soluble in water such as oxides thereof, ruthenium dichloride, platinum dichloride and like chlorides, ruthenium sulfide, rhodium sulfide and like sulfides, etc. At least one of them is supported on the carrier. The amount of the active component to be supported by the carrier is not specifically limited but usually about 0.05 to about 25%, preferably about 0.5 to about 3%, based on the weight of the carrier. All catalysts to be used in the present invention as well as the catalyst useful in the step I-(ii) can be prepared by conventional methods, for example, by causing a carrier to support the active component of catalyst thereon or by mixing a material for the active component of catalyst with a carrier material, shaping the mixture into the desired shape, drying the shaped body, reducing the same if required, and baking it. The reactor column has a volume such that the waste water is passed therethrough at a space velocity of about 0.3 to about 10 1/hr, preferably about 0.5 to about 4 1/hr, based on an empty column. When the required oxygen amount is supplied wholly to the waste water in the step I-(i) as stated above, an oxygen-containing gas need not be fed in the step I-(ii). In other words, only when the required oxygen amount is supplied partly in the step I-(i), the oxygen-containing gas is fed in an amount corresponding to the remaining oxygen amount to the step I-(ii). The reaction temperature in the step I-(ii) is usually about 100° to about 370° C., preferably about 200° to about 300° C. The reaction pressure is such that the waste water can at least retain its liquid phase at the predetermined temperature. In this way, the reaction in the step I-(ii) decomposes substantially the entire portions of suspended solids, COD components and ammonia left undecomposed at the step I-(i).

The waste water treated in the step I-(ii) may contain a decomposition product such as sodium sulfate and the like. If the decomposition product from the step I-(ii) is to be desalted for reuse, the water is fed from the step I-(ii) in a pressurized state directly to a reverse osmosis equipment as the third step (hereinafter referred to as "step I-(iii)") wherein the water is separated into clear water and concentrated liquid. The clear water can be reused for a variety of applications, e.g. as industrial water and the like, and concentrated liquid can be mixed with the starting waste water for treatment according to the process of the invention, or can be processed for recovery of sodium sulfate or like useful materials.

(II) In the first step of the process II (hereinafter referred to as "step II-(i)"), the waste water to be treated is subjected to liquid oxidation in the absence of a catalyst and in the presence of an oxygen-containing gas under the same conditions as those in the step I-(i).

Examples of the catalyst useful in the second step of the process II (hereinafter referred to as "step II-(ii)") are the same as those usable in the step I-(ii). The reaction conditions in the step II-(ii) can be more moderate than those in the step I-(ii) because in the subsequent step of the process II, the waste water is subjected to further liquid phase oxidation in the presence of a granular catalyst. The reaction temperature in the step II-(ii) is usually about 100° to about 300° C., preferably about 200° to about 290° C. The pressure in the step II-(ii) is such that the waste water from the step II-(i) can at least retain its liquid phase at the predetermined temperature. When fed partly to the waste water in the step II-(i), an oxygen-containing gas is supplied in an amount corresponding to the remaining oxygen amount wholly in the step II-(ii) or dividedly in the step II-(ii) and the subsequent step. In the latter case, the oxygen-containing gas is sent in an amount corresponding to about 0.3 to about 0.7 time the theoretical oxygen amount in the step II-(ii), leaving the remaining amount for further supply to the subsequent step.

In the third step of the process II (hereinafter referred to as "step II-(iii)"), the water from the step II-(ii) is submitted again to liquid phase oxidation in the presence of an oxygen-containing gas and a catalyst supported by a granular carrier. The reaction temperature is usually about 100° to 300° C., preferably about 200° to about 290° C. Examples of active components of the catalyst include those exemplified above as useful in the step I-(ii). The active components of the catalyst are used as supported in the conventional manner by a carrier such as alumina, silica, silica-alumina, titania, zirconia, activated carbon and like granular carriers, nickel, nickel-chromium, nickel-chromium-aluminum, nickel-chromium-iron and like metallic porous granualr carriers, etc. The term "granular" used throughout the specification and the appended claims refers to various forms such as globules, pellets, cylinders, crushed fragments, particles, etc. The amount of the active component to be supported by the carrier is usually about 0.05 to about 25%, preferably about 0.5 to about 3%, based on the weight of the carrier. The reactor used is of fixed bed type. The reactor column used has a volume such that the waste water is passed therethrough at a space velocity of about 0.5 to about 10 1/hr, preferably about 1 to about 4 1/hr, based on an empty column.

When required, the water from the step II-(iii) is further sent under pressure to a reverse osmosis equipment in the same manner as done for the water from the step I-(ii) to separate the water into clear water and concentrated liquid (this step will be hereinafter called "step II-(iv)"). The step II-(iv) can be carried out in the same manner as the step I-(iii).

The waste water having a pH of about 8 to about 11.5, preferably about 9 to about 11, in the steps of the processes I and II can undergo liquid phase oxidations with high efficiency. For this reason, it is preferred to adjust the pH of the waste water before treatment with an alkali substance such as sodium hydroxide, sodium carbonate, calcium hydroxide and the like or with the same alkali substance added to the water to be treated in the steps I-(ii), II-(ii) and II-(iii). Even if waste water to be initially treated or treated water to be further oxidized at each step has a pH of about 8 to about 11.5 at the start of the reaction, the progress of the reaction may greatly reduce the pH of the reaction system and consequently lead to a reduced harmful component decomposition efficiency, possibly necessitating an increased amount of catalyst, accelerating the consumption and degradation of the catalyst and causing acid liquids to seriously damage the reactor, piping, heat exchanger and the like. To avert these problems, it is preferred to add a suitable amount of the same alkali substance as above to the reaction system to adjust the pH of the system to about 5 to about 8 at the outlet of the reactor in each of the steps I-(ii) and II-(iii).

Preferably the pH adjustment is performed in the same manner at the steps in the processes III-VII to be described later.

(III) In the first step of the process III (hereinafter referred to as "step III-(i)"), the waste water to be treated is subjected to liquid phase oxidation in the absence of a catalyst and in the presence of an oxygen-containing gas under the same conditions as those of the step I-(i).

In the second step of the process III (hereinafter referred to as "step III-(ii)"), the water from the step III-(i) is subjected again to liquid oxidation in the presence of a honeycomb structure with no catalyst supported thereon. Useful honeycomb structures are those similar to the carrier used in the step I-(ii) in respect of the shape, area per unit volume, aperture ratio, material and the like. The reactor column used has a volume sufficient to permit the waste water to pass therethrough at a space velocity of about 0.3 to about 10 1/hr, preferably about 0.5 to about 4 1/hr, based on an empty column. As described above, when the whole oxygen amount required is added to the waste water in the step III-(i), no feed of oxygen-containing gas is needed in the step III-(ii) and the subsequent step. Only in the case of partial feed to the step III-(i), an oxygen-containing gas is added in an amount corresponding to the remaining oxygen amount. The reaction temperature in the step III-(ii) is usually about 100° to about 370° C., preferably about 200° to about 300° C. The pressure in the step III-(ii) is such that the waste water from the step III-(i) can at least retain its liquid phase at the predetermined temperature.

In the third step of the process III (hereinafter referred to as "step III-(iii)"), the water from the step III-(ii) is further subjected to liquid phase oxidation in the presence of a catalyst supported by a carrier of honeycomb construction. The same type of catalyst as used in the step I-(ii) are usable as such. The reactor column used has a volume sufficient to permit the waste water to pass therethrough at a space velocity of about 0.3 to about 10 1/hr, preferably about 0.5 to about 4 1/hr, based on an empty column. As set forth hereinbefore, only when fed partly in the step III-(i) or in the steps III-(i) and III-(ii), an oxygen-containing gas is supplied in an amount corresponding to the remaining oxygen amount in the step III-(iii). The reaction temperature in the step III-(iii) is usually about 100° to about 300° C., preferably about 200° to about 290° C. The pressure in the step III-(iii) is such that the waste water from the step III-(ii) can at least retain its liquid phase. In this way, decomposition takes place of substantially all portions of the suspended solids, COD components and ammonia left undecomposed in the steps III-(i) and III-(ii).

The waste water treated in the step III-(iii) may contain a decomposition product such as sodium sulfate and the like. If the decomposition product in such case is desalted for reuse, the water is fed from the step III-(iii) in a pressurized state directly to a reverse osmosis equipment in the same manner as done for the water treated in the step step I-(ii) to separate the water into clear water and concentrated liquid.

(IV) In the first step of the process IV (hereinafter referred to as "step IV-(i)"), the waste water to be treated is subjected to liquid phase oxidation in the presence of an oxygen-containing gas and in the absence of a catalyst under the same conditions as those in the step III-(i).

The honeycomb structure of the type used in the step III-(ii) is usable in the second step of the process IV (hereinafter referred to as "step IV-(ii)"). The reaction conditions in the step IV-(ii) can be more moderate than those in the step III-(ii) because the process IV includes the step of liquid phase oxidation in the presence of a granular catalyst. The reaction temperature in the step IV-(ii) is usually about 100° to about 300° C., preferably about 200° to about 290° C. The pressure in the step IV-(ii) is such that the waste water from the step IV-(i) can at least retain its liquid phase at the predetermined temperature. When fed partly to the waste water in the step IV-(i), an oxygen-containing gas is supplied in an amount corresponding to the remaining oxygen amount wholly in the step IV-(ii) or dividedly in the step IV-(ii) and the subsequent step. In the latter case, the oxygen-containing gas is fed in an amount corresponding to about 0.3 to about 0.7 time the theoretical oxygen amount to the step IV-(ii), leaving the remaining amount for further feed to the subsequent step.

In the third step of the process IV (hereinafter referred to as "step IV-(iii)"), the honeycomb catalyst of the type used in the step I-(ii) is usable. The reaction temperature in the step IV-(iii) is usually about 100° to about 300° C., preferably about 200° to about 290° C. The pressure in the step IV-(iii) is such that the waste water from the step IV-(ii) can at least retain its liquid phase. When required, an oxygen-containing gas may be also supplied in this step.

In the fourth step of the process IV (hereinafter referred to as "step IV-(iv)"), the water from the step IV-(iii) is subjected to liquid phase oxidation in the presence of an oxygen-containing gas and a catalyst supported by a granular carrier. The catalyst, liquid phase oxidation reaction conditions and the like involved in this step are all the same as those in the step II-(iii).

When required, the waste water treated in the step IV-(iv) is sent in a pressurized state to a reverse osmosis equipment in the same manner as above to separate the water into clear water and concentrated liquid (this step will be hereinafter referred to as "step IV-(v)"). The step IV-(v) can be effected in the same manner as the step I-(iii).

(V) In the first step of the process V (hereinafter referred to as "step V-(i)"), the waste water to be treated is subjected to liquid phase oxidation in the absence of a catalyst and in the presence of an oxygen-containing gas and a honeycomb structure. The honeycomb structure of the type used in the step III-(ii) is usable in this step. An oxygen-containing gas is supplied in an amount corresponding to about 1 to about 1.5 times, preferably about 1.05 to about 1.2 times, the theoretical amount of oxygen required for the oxidation of the whole amounts of suspended solids, ammonia and COD components in the waste water (or in the waste water and waste gas) to nitrogen, carbonic acid gas, water and the like. The oxygen-containing gas need not be wholly fed to the step V-(i) and may be supplied as distributed to the step V-(i) and the subsequent step. For example, the reaction in the step V-(i) can decompose about 10 to about 70% of suspended solids, about 10 to about 60% of COD components and 0 to about 15% of ammonia so that the oxygen-containing gas may be fed to the step V-(i) in an amount corresponding to about 0.4 to about 0.7 time the theoretical oxygen amount, leaving the remaining amount for further feed to the subsequent step. The reaction temperature in the step V-(i) is usually about 100° to about 370° C., preferably about 200° to about 300° C. The pressure in the step V-(i) is such that the waste water can at least retain its liquid phase at determined temperature.

In the second step of the process V (hereinafter referred to as "step V-(ii)", the water from the step V-(i) is subjected again to liquid oxidation in the presence of a catalyst supported by a carrier with honeycomb construction. Usable as the catalyst in this step are those of the type used in the step I-(ii). The reactor column used has a volume sufficient to permit the waste water to pass therethrough at a space velocity of about 0.3 to about 10 1/hr, preferably about 0.5 to about 4 1/hr, based on an empty column. As described above, when the total oxygen amount is added to the waste water in the step V-(i), no feed of oxygen-containing gas is needed in the step V-(ii). Only in the case of partial feed to the step V-(i), an oxygen-containing gas is added in an amount corresponding to the remaining oxygen amount. The reaction temperature in the step V-(ii) is usually about 100° to about 370° C., preferably about 200° to about 300° C. The reaction pressure in the step V-(ii) is such that the waste water from the step V-(i) can at least retain its liquid phase at the predetermined temperature. In this way, the reaction in this step decomposes virtually the whole amounts of suspended solids, COD components and ammonia left undecomposed in the step V-(i).

The waste water treated in the step V-(ii) may contain a decomposition product such as sodium sulfate and the like. If the decomposition product in such case is desalted for reuse, the water to be treated is fed from the step V-(ii) in a pressurized state directly or after reduction of the pressure to a reverse osmosis equipment in the same manner as done for the water treated in the step I-(ii) to separate the water into clear water and concentrated liquid (this step will be hereinafter referred to as "step V-(iii)").

(VI) In the first step of the process VI (hereinafter referred to as "step VI-(i)"), the waste water to be treated is subjected to liquid phase oxidation in the presence of an oxygen-containing gas and a honeycomb structure under the same conditions as those in the step V-(i).

The catalyst useful in the step V-(ii) is usable in the second step of the process VI (hereinafter referred to as "step VI-(ii)"). The reaction conditions in the step VI-(ii) can be more moderate than those in the step V-(ii) because the subsequent step of the process VI performs a further liquid phase oxidation in the presence of a granular catalyst. The reaction temperature in the step VI-(ii) is usually about 100° to about 300° C., preferably about 200° to about 290° C. The pressure in the step VI-(ii) is such that the waste water from the step VI-(i) can at least retain its liquid phase at the predetermined temperature. When fed partly to the waste water in the step VI-(i), an oxygen-containing gas is supplied in an amount corresponding to the remaining oxygen amount wholly in the step VI-(ii) or dividedly in the step VI-(ii) and the subsequent step. In the latter case, the oxygen-containing gas is fed in an amount corresponding to about 0.3 to about 0.7 time the theoretical oxygen amount in the step VI-(ii), leaving the remaining amount for further feed to the subsequent step.

In the third step of the process VI (hereinafter referred to as "step VI-(iii)"), the waste water from the step VI-(ii) is subjected to liquid phase oxidation in the presence of an oxygen-containing gas and the same catalyst supported by a granular carrier as used in the step II-(iii). The reaction temperature and pressure, volume of the reactor column, space velocity and other reaction conditions involved in this step are all the same as those in the step II-(iii).

The water treated in the step VI-(iii) can be, if required, supplied in a pressurized state in the same manner as done for the water treated in the step I-(ii) to a reverse osmosis equipment to separate the water into clear water and concentrated liquid (this step will be hereinafter referred to as "step VI-(iv)").

(VII) The process VII closely corresponds to the process VI but excludes the step VI-(i).

In the first step of the process VII (hereinafter referred to as "step VII-(i)"), the waste water to be treated is subjected to liquid phase oxidation in the presence of an oxygen-containing gas and a catalyst supported by a carrier of honeycomb construction. The catalyst of the type used in the step II-(ii) is usable in this step. The reaction temperature in the step VII-(i) is usually about 100° to about 370° C., preferably about 200° to about 300° C. The pressure in the step VII-(i) is such that the waste water can at least retain its liquid phase at the predetermined temperature. The reactor column used has a volume such that the waste water is passed therethrough at a space velocity of about 0.3 to about 10 1/hr, preferably about 0.5 to about 4 1/hr, based on an empty column. An oxygen-containing gas is supplied in an amount corresponding to about 1 to about 1.5 times, preferably about 1.05 to about 1.2 times, the theoretical amount of oxygen required for the oxidation of suspended solids, ammonia and COD components in the waste water to nitrogen, carbonic acid gas, water and the like. The oxygen-containing gas may be fed as distributed to the steps VII-(i) and the subsequent step. For example, the reaction in the step VII-(i) can decompose about 10 to about 90% of suspended solids, about 10 to about 90% of COD components and 10 to about 90% of ammonia so that the oxygen-containing gas may be charged to the step VII-(i) in an amount corresponding to about 0.3 to about 0.9 time the theoretical oxygen amount, leaving the remaining amount for further feed to the subsequent step.

Next in the second step of the process VII (hereinafter referred to as "step VII-(ii)"), the water treated in the step VII-(i) is subjected to liquid phase oxidation in the presence of an oxygen-containing gas and a catalyst supported by a granular carrier. The step VII-(ii) can be conducted under the same conditions as those in the step II-(iii) described hereinbefore.

According to the present invention, the processes can treat waste water containing suspended solids in a high concentration as well as ammonia and COD components with high efficiency.

The processes of the invention can also perform the decolorization, deodorization and sterilization of the waste water.

DESCRIPTION OF THE INVENTION WITH REFERENCE TO DRAWINGS

The objects, features and advantages of the invention will become apparent from the following description of the invention with reference to the accompanying drawings which are given for illustrative purposes only and to which the invention is not limited. In the drawings, FIGS. 1 to 7 are flow charts each showing the processes I and VII, respectively.

(I) FIG. 1 is a flow chart illustrating one mode of the process I. Referring to FIG. 1, the waste water containing suspended solids, ammonia and COD components is supplied from a waste water tank 1 under pressure through a line 5 by a pump 3. Then the water is mixed with an oxygen-containing gas pressurized by a compressor 7 and led through a line 9. The mixture is passed via a line 11 and a heat exchanger 13 to a line 15. When heated to higher than the predetermined temperature by the heat transfer at the heat exchanger 13, the water is supplied through lines 17 and 19 to a first reactor 21. On the other hand, when remaining at lower than the specified temperature, the water is sent through a line 23 to a heater 25 and admitted via lines 27 and 19 to a first reactor or reaction zone 21. When required, an alkali substance, which is usually in the form of an aqueous solution, is supplied from an alkali substance tank 29 via a line 31, a pump 33 and lines 35 and 37 to join the waste water. The waste water in the first reactor 21 is subjected to liquid phase oxidation in the absence of a catalyst and in the presence of an oxygen-containing gas.

The treated water flowing out of the first reactor 21 is sent to a second reactor or reaction zone 39 containing a catalyst with its active component supported on a carrier of honeycomb construction where the water is subjected again to liquid phase oxidation. The oxygen-containing gas may be supplied from the compressor 7 through a line 41 to the treated water in the first reactor 21. The alkali substance may be fed from the tank 29 through the line 31, the pump 33, the line 35 and a line 43 to the treated water. The alkali substance may be introduced into a suitable location (not shown) each of the first reactor 21 and the second reactor 39.

The water submitted to liquid phase oxidation in the second reactor 39 is passed through a line 45 into the heat exchanger 13 in which thermal energy is transferred to the untreated waste water. Thereafter the water is admitted via a line 47 to a cooler 49 and cooled therein. The treated water drawn off from the cooler 49 is conducted via a line 51 to a gas-liquid separator 53 where the treated water is separated into a gas flowing through a line 55 and a liquid flowing through a line 57. The liquid running via the line 57 in a pressurized state is admitted to a reverse osmosis device 59 in which the liquid is separated into clarified water running via a line 61 and concentrated liquid running via a line 63. The concentrated liquid is returned to the waste water tank 1 by way of a line 63.

Figure 2:
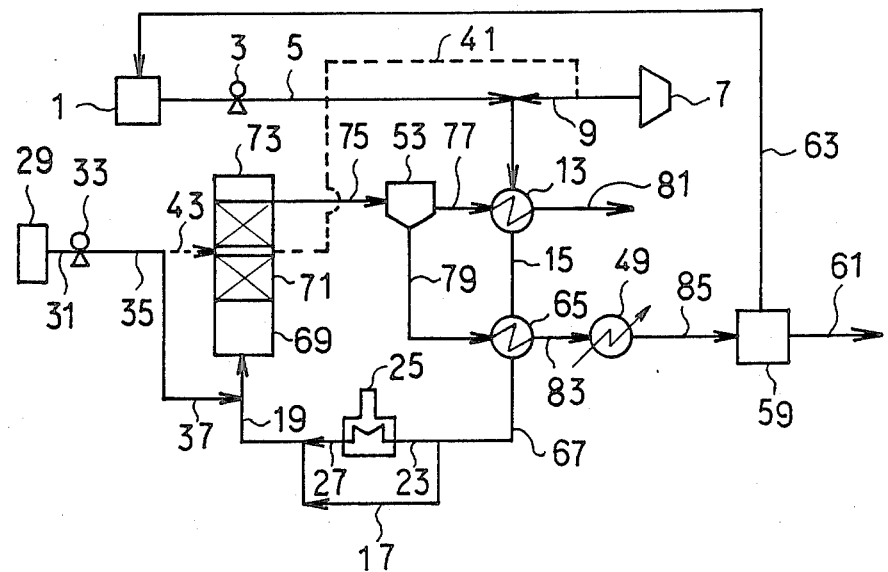

(II) FIG. 2 is a flow chart showing a mode of the process II. In FIGS. 2 to 7, the same numerals as used in FIG. 1 denote the same members as a rule. The waste water discharged from a waste water tank 1 is heated by a first heat exchanger 13 and a second heat exchanger 65. The waste water thus heated is passed through a line 67 to a heater 25. After further heating or not heating by the heater 25, the water is admitted to a first reactor 69 and subjected to liquid oxidation without a catalyst in the reactor 69. The treated water is introduced into a second reactor 71 and submitted to liquid phase oxidation in the presence of a catalyst of honeycomb construction in the second reactor 71. Then the water is charged into a third reactor 73 and further subjected to liquid phase oxidation in the presence of a granular catalyst. The treated water flowing out of the third reactor 73 is led through a line 75 to a gas-liquid separator 53 and separated into a gas running via a line 77 and a liquid running via a line 79. The gas flowing through the line 77 is conducted to the heat exchanger 13 to apply thermal energy to the waste water and is drawn off from a line 81. On the other hand, the liquid running in the line 79 is sent to the second heat exchanger 65 to heat further the waste water, passed by way of a line 83 to a cooler 49, cooled therein, led through a line 85 under pressure to a reverse osmosis device 59 and separated into clarified water running via a line 61 and concentrated liquid running via a line 63.

In the process I, the treated water flowing through the line 45 in FIG. 1 may be optionally sent to an equivalent of the gas-liquid separator shown in FIG. 2 and subsequently processed in the same manner as in the mode in FIG. 2. Likewise, in the process II, the treated water flowing via the line 75 in FIG. 2 may be optionally admitted to an equivalent of the heat exchanger 13 shown in FIG. 1 and subsequently processed in the same way as in the mode in FIG. 1.

Figure 3:
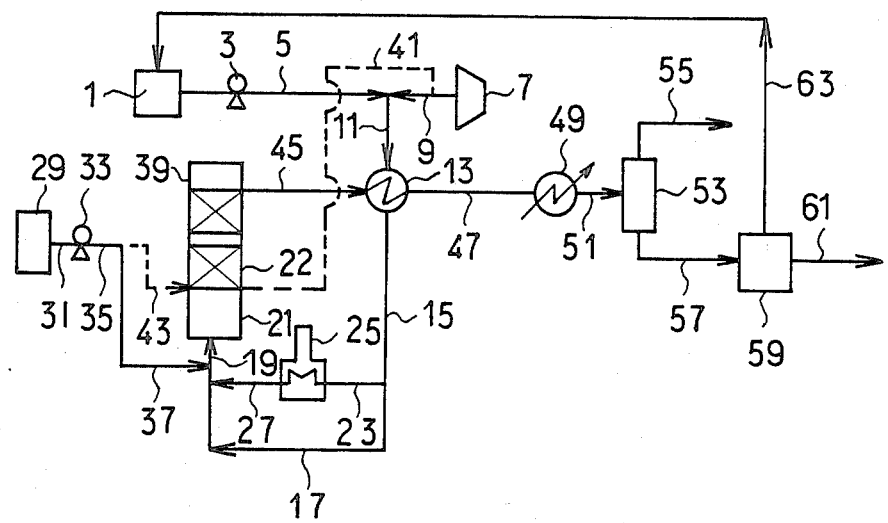

(III) FIG. 3 is a flow chart showing a mode of the process III. The process III differs from the process I (FIG. 1) in that the process III includes a reactor 22 for liquid phase oxidation containing a honeycomb structure at a location intermediate between a reactor 21 for liquid phase oxidation without a catalyst and a reactor 34 for liquid phase oxidation in the presence of a catalyst of honeycomb construction.

Figure 4:
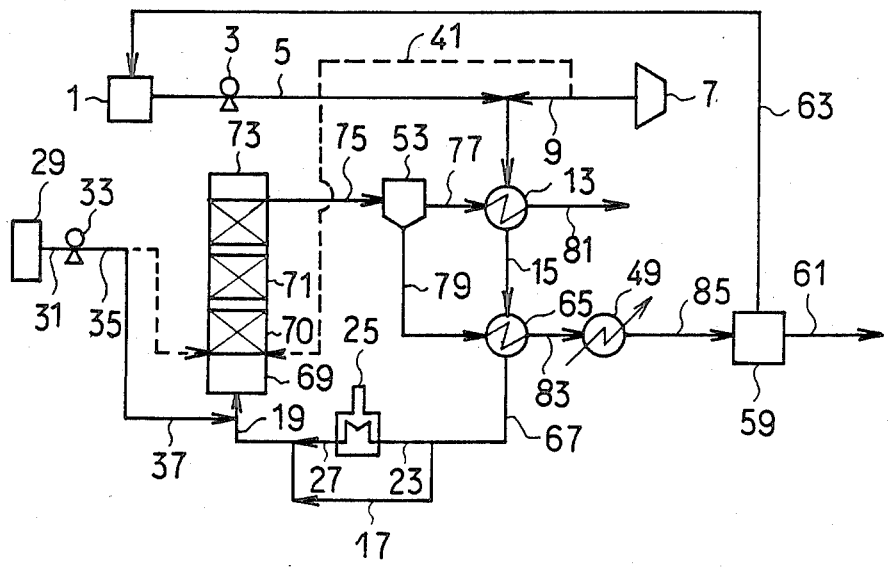

(IV) FIG. 4 is a flow chart showing a mode of the process IV. The process IV differs from the process II (FIG. 2) in that the process IV includes a reactor 70 for liquid phase oxidation containing a honeycomb structure at a location intermediate between a reactor 69 for liquid phase oxidation without a catalyst and a reactor 71 for liquid phase oxidation in the presence of a catalyst of honeycomb construction.

Figure 5:
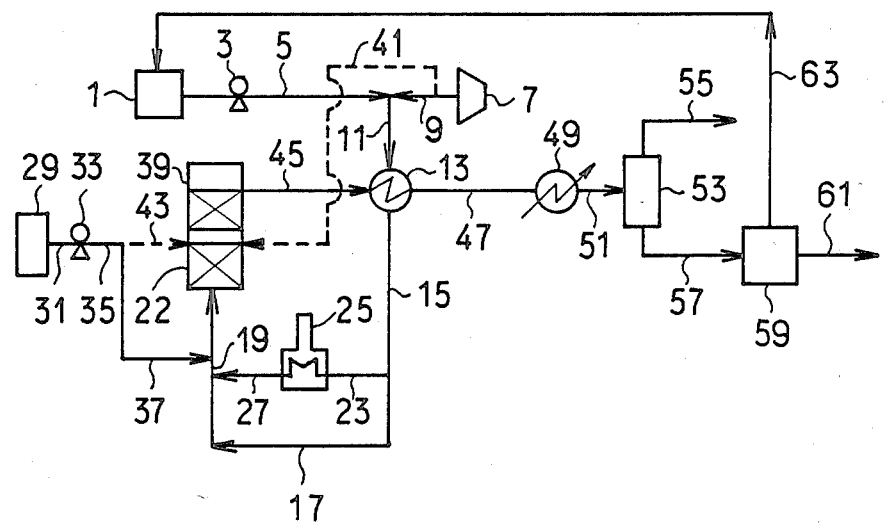

(V) FIG. 5 is a flow chart showing a mode of the process V. In the process V, waste water is processed in a liquid phase oxidation reactor 22 containing a honeycomb structure and thereafter processed again in a liquid phase oxidation reactor 39 packed with a catalyst of honeycomb construction. The process V can be carried out substantially in the same manner as the process I (FIG. 1) in respect of other procedures.

Figure 6:
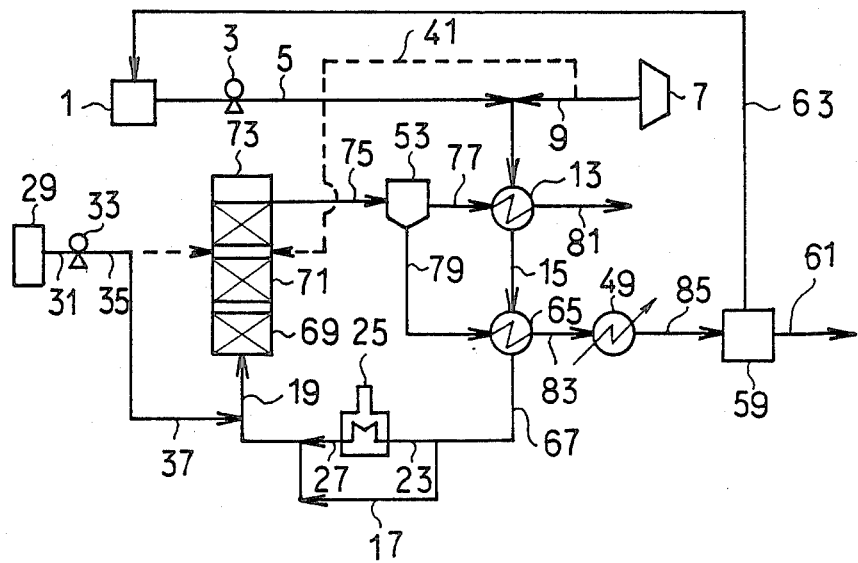

(VI) FIG. 6 is a flow chart showing a mode of the process VI. In the process VI, waste water is processed in a liquid phase oxidation reactor 69 containing a honeycomb structure, a liquid phase oxidation reactor 71 packed with a catalyst of honeycomb construction and a liquid phase oxidation reactor 73 packed with a granular catalyst in sequence. The process VI is carried out substantially in the same manner as the process II (FIG. 2) in respect of other procedures.

Figure 7:
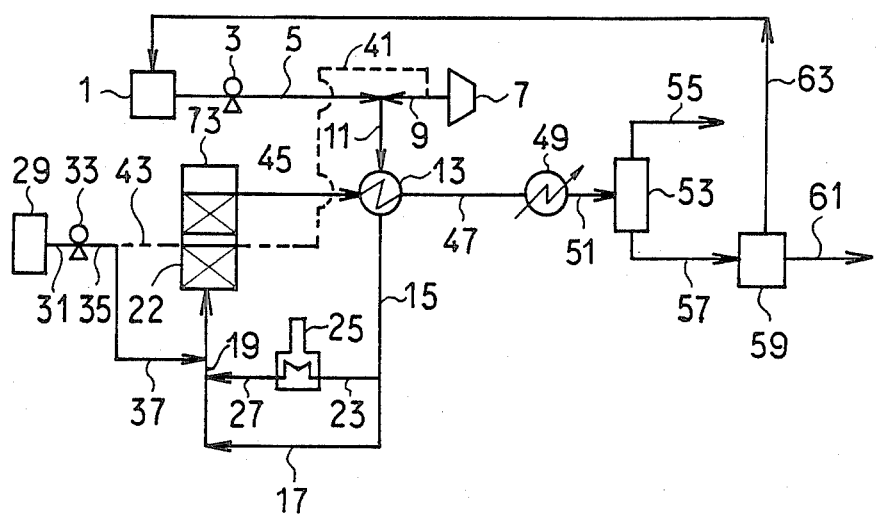

(VII) FIG. 7 is a flow chart showing a mode of the process VII. In the process VII, waste water is processed in a liquid phase oxidation reactor 22 containing a catalyst of honeycomb construction and a liquid phase oxidation reactor 73 containing a granular catalyst in sequence. The process VII is carried out substantially in the same manner as the process I (FIG. 1) in respect of other procedures.

The present invention will be described below in greater detail with reference to the following examples.

EXAMPLE 1

Raw human waste is subjected to liquid phase oxidation by the process I according to the mode shown in FIG. 1. Table 1 below shows the components and properties of the raw human waste used. The human waste was passed through a swing disk screen (mesh size: 3 mm) to remove the large-size plastics pieces and paper sheets from the waste.

TABLE 1

| pH | 6.85 |
|---|---|
| COD components (mg/l) | 4900 |
| $NH_3$—N (mg/l) | 3090 |
| Total-N (mg/l) | 4100 |
| BOD components* (mg/l) | 15300 |
| Suspended solids (mg/l) | 20000 |
| Total oxygen demand (mg/l) | 26600 |
| Total-C (mg/l) | 6200 |
| Phosphorus (mg/l) | 100 |

*BOD components = biochemically oxidizable substances Step I-(i)

To the raw human waste was added a 20% aqueous solution of sodium hydroxide to adjust the pH of the waste to about 9. The mixture was fed to a lower portion of the first reactor 21 at a space velocity of 1.0 l/hr (based on an empty column) and a mass velocity of 2.39 t/m² hr. Air was introduced into the lower portion of the first reactor 21 at a space velocity of 89.8 l/hr (based on an empty column, under standard conditions). The waste was subjected in the reactor to liquid phase oxidation without a catalyst at a temperature of 280° C. and pressure of 90 kg/cm²·G.

Table 2 below shows the components and properties of the waste thus treated.

TABLE 2

| pH | 6.7 |
|---|---|
| COD components (mg/l) | 2205 |
| $NH_3$—N (mg/l) | 3050 |
| Total-N (mg/l) | 4020 |
| BOD components* (mg/l) | 7000 |
| Suspended solids (mg/l) | 8000 |
| Total oxygen demand (mg/l) | 12600 |
| Total-C (mg/l) | 2790 |
| Phosphorus (mg/l) | 80 |

*BOD components = biochemically oxidizable substances Step I-(ii)

The waste treated in the step I-(i) was supplied to the second reactor 39 containing a catalyst supported by a titania carrier of honeycomb construction with square cell apertures (3.5 mm in length of one side) having a cell pitch of 4.5 and an aperture ratio of 59.3% and composed of 2% by weight of ruthenium based on the weight of the carrier. The reactor 39 had the same empty column volume as the first reactor 21. To the reactor 39 was fed a 20% aqueous solution of sodium hydroxide. Then the waste was subjected to liquid phase oxidation. The reaction temperature and pressure were the same as those in the step I-(i).

Table 3 below shows the components and properties of the waste thus treated.

TABLE 3

| pH | 7.2 |
|---|---|
| COD components (mg/l) | 17 |
| $NH_3$—N (mg/l) | 15 |
| Total-N (mg/l) | 20 |
| BOD components* (mg/l) | 15 |
| Suspended solids (mg/l) | 20 |
| Total oxygen demand (mg/l) | 35 |
| Total-C (mg/l) | 10 |
| Phosphorus (mg/l) | 9 |

*BOD components = biochemically oxidizable substances Step I-(iii)

The treated water obtained in the step I-(ii) was cooled at the heat exchanger 13 and at the cooler 49, and fed to the gas-liquid separator 53. The liquid from the separator was introduced into the reverse osmosis device 59 under a pressure adjusted to 65 kg/cm². Thus 85 parts by weight of clarified water and 15 parts by weight of concentrated liquid per 100 parts by weight of the liquid supplied were obtained in the reverse osmosis device 59.

Table 4 below shows the quality of clarified water.

TABLE 4

| pH | 6.9 |
|---|---|
| COD components (mg/l) | Less than 1.0 |
| $NH_3$—N (mg/l) | Trace |
| Total-N (mg/l) | Less than 1.0 |
| BOD components* (mg/l) | Less than 1.0 |
| Suspended solids (mg/l) | Trace |

*BOD components = biochemically oxidizable substances

The concentrated liquid was returned by way of the line 63 to the waste water tank 1.

The gas run off from the gas-liquid separator 53 was found to contain less than 0.01 ppm of $NH_3$ and less than 0.01 ppm of $SO_x$, but no amount of $NO_x$ was detected.

The water containing suspended solids in a high concentration was treated for 5,000 hours but involved no precipitation nor deposition of solids on the catalyst or no reduction in decomposition efficiency of components. Thus subsequent treatment proceeded without trouble.

EXAMPLE 2

Raw human waste was subjected to liquid phase oxidation by the process II according to the mode shown in FIG. 2. The raw human waste used had substantially the same components and properties as those of the waste used in Example 1.

The reactions in the steps II-(i) and II-(iv) were carried out in the same manner as those in the steps I-(i) and I-(iii) of Example 1.

The combined amount of catalysts used in the steps II-(ii) and II-(iii) was the same as the amount of catalyst in the step I-(ii) of Example 1. The catalyst composed of 2% by weight of ruthenium supported by a zirconium honeycomb carrier and the catalyst composed of 2% by weight of ruthenium supported by a zirconium granular carrier (5 mm in diameter) were used in the steps II-(ii) and II-(iii) in a ratio of 1:1. The other conditions in the steps II-(ii) and II-(iii) were the same as those in the step I-(i) of Example 1.

A 20% aqueous solution of sodium hydroxide was added at the inlet of the step II-(ii) to adjust the pH of the water to 7.6 at the outlet of the step II-(iii).

Table 5 below shows the quality of water at each outlet of the steps.

TABLE 5

|  | Outlet of step II-(i) | Outlet of step II-(ii) | Outlet of step II-(iii) | Outlet of step II-(iv) (Clarified water) |
|---|---|---|---|---|
| pH | 6.7 | 9.1 | 7.6 | 7.1 |
| COD components (mg/l) | 2205 | 421 | 13 | Less than 1.0 |
| $NH_3$—N (mg/l) | 3050 | 446 | Trace | Trace |
| Total-N (mg/l) | 4020 | 460 | 5 | Trace |
| BOD components* (mg/l) | 7000 | 400 | 10 | Less than 1.0 |
| Suspended solids (mg/l) | 8000 | 1650 | Trace | Trace |
| Total oxygen demand (mg/l) | 12600 | 1900 | 20 | Trace |
| Total-C (mg/l) | 2790 | 259 | 8 | Trace |
| Phosphorus (mg/l) | 80 | 25 | 7 | Trace |

*BOD components = biochemically oxidizable substances

None of $NH_3$, $SO_x$ and $NO_x$ were detected in the gas drawn off from the gas-liquid separator 53.

EXAMPLES 3 to 8

The same raw human waste as used in Example 1 was subjected to liquid phase oxidation by the process II according to the mode shown in FIG. 2.

The reactions in the steps II-(i), II-(ii) and II-(iii) were carried out all at a temperature of 250° C. and pressure of 70 kg/cm$^2$·G. The liquid space velocity was 1.0 l/hr (based on an empty column) in the step II-(i) and 0.67 l/hr (based on an empty column) in the steps II-(ii) and II-(iii) as combined. The catalysts were used in the steps II-(ii) and II-(iii) in a ratio of 1:1.

Table 6 below shows the catalysts used in the steps II-(ii) and II-(iii).

The other conditions were the same as those in Example 2. The quality of water obtained in the steps II-(ii) and II-(iii) is also shown below in Table 6.

The quality of water at the outlet of the step II-(iv) in any of Examples 3 to 8 was almost at the same level as that in Example 2.

None of $NH_3$, $SO_x$ and $NO_x$ were detected in the gas drawn off from the gas-liquid separator 53.

EXAMPLES 9 to 12

The same raw human waste as used in Example 1 was subjected to liquid phase oxidation by the process II according to the mode shown in FIG. 2.

The reactions of the steps II-(i), II-(ii) and II-(iii) were carried out all at a temperature of 280° C. and pressure of 90 kg/cm$^2$·G. The liquid space velocity was 2.0 l/hr (based on an empty column) in the steps II-(i) and II-(iii) and 1.01 l/hr (based on an empty column) in the step II-(ii). The mass velocity was 2.8 t/m$^2$ hr in the step II-(i). The amount of honeycomb catalyst (supported on a zirconia carrier of the same type as used in Example 1) used in the step II-(ii) was twice the amount of granular catalyst (supported on a zirconia carrier of the same type as used in Example 2) in the step II-(iii).

Air was fed to the inlet in the step II-(i) in an amount corresponding to 0.7 time the theoretical oxygen amount and to the inlet in the step II-(II) in an amount corresponding to 0.5 time the theoretical oxygen amount.

A 20% aqueous solution of sodium hydroxide was continuously supplied to the inlets in the steps II-(ii) and II-(iii) to adjust the pH of the water to 7.6 at the outlet of the step II-(iii).

The other conditions were the same as those in Example 2. Tables 7 and 8 below shows the quality of water treated in the steps and the catalysts used in the steps II-(ii) and II-(iii).

TABLE 6

| Ex. | Catalyst*1 in step II-(ii) | Outlet of step II-(ii) (mg/l) COD component | Outlet of step II-(ii) (mg/l) $NH_3$—N | Catalyst*2 in step II-(iii) | Outlet of step II-(iii) (mg/l) COD components | Outlet of step II-(iii) (mg/l) $NH_3$—N |
|---|---|---|---|---|---|---|
| 3 | 2% Rhodium | 460 | 420 | 2% Ruthenium | 15 | Trace |
| 4 | 2% Palladium | 430 | 380 | " | 14 | " |
| 5 | 2% Iridium | 620 | 540 | " | 20 | " |
| 6 | 0.5% Platinum | 380 | 397 | " | 13 | " |
| 7 | 10% Cobalt | 840 | 790 | " | 19 | 2.8 |
| 8 | 10% Nickel | 645 | 680 | " | 18 | 2.0 |

*1: supported on a zirconium honeycomb carrier of the same type as used in Example 1
*2: supported on a zirconium granular carrier of the same type as used in Example 1

TABLE 7

| Ex. | Outlet of step II-(i) (mg/l) COD components | Outlet of step II-(i) (mg/l) $NH_3$—N | Catalyst in step II-(ii) | Outlet of step II-(ii) (mg/l) COD components | Outlet of step II-(ii) (mg/l) $NH_3$—N |
|---|---|---|---|---|---|
| 9 | 2905 | 3085 | 5% Tungsten | 620 | 480 |
| 10 | " | " | 5% Copper | 603 | 595 |
| 11 | " | " | 5% Iron | 790 | 783 |

TABLE 7-continued

| | Outlet of step II-(i) (mg/l) | | | Outlet of step II-(ii) (mg/l) | |
|---|---|---|---|---|---|
| Ex. | COD components | NH$_3$—N | Catalyst in step II-(ii) | COD components | NH$_3$—N |
| 12 | " | " | 0.5% Gold | 89 | 108 |

TABLE 8

| | Catalyst in step | Outlet of step II-(iii) (mg/l) | | Outlet of step II-(iv) (mg/l) | | |
|---|---|---|---|---|---|---|
| Ex. | II-(iii) | COD components | NH$_3$—N | COD components | NH$_3$—N | SS* |
| 9 | 2% Ruthenium | 14 | Trace | Less than 1.0 | Trace | Trace |
| 10 | " | 13 | " | " | " | " |
| 11 | " | 19 | " | " | " | " |
| 12 | " | 10 | " | " | " | " |

*SS = Suspended solids

Substantially none of NH$_3$, SO$_x$ and NO$_x$ were detected in the gas drawn off from the gas-liquid separator 53 in any of Examples 9 to 12.

EXAMPLES 13 to 22

Raw human waste was subjected to liquid phase oxidation in the same manner as in Examples 9 to 12 with the exception of using the catalysts listed below in Tables 9 and 10 in the steps II-(i) and II-(ii).

Tables 9 and 10 also show the quality of water treated in the steps.

None of NH$_3$, SO$_x$ and NO$_x$ were detected in the gas drawn off from the gas-liquid separator 53 in any of Examples 13 to 22.

Table 11 was subjected to liquid phase oxidation by the process II according to the mode illustrated in FIG. 2. The treatment conditions were the same as those in Example 2 except that air was fed in an amount corresponding to 1.2 times the theoretical oxygen amount.

TABLE 11

| | |
|---|---|
| pH | 7.3 |
| COD components (mg/l) | 10200 |
| NH$_3$—N (mg/l) | 1500 |
| Total-N (mg/l) | 2000 |
| BOD components* (mg/l) | 22000 |
| Suspended solids (mg/l) | 26000 |
| Total oxygen demand (mg/l) | 53000 |

*BOD components = biochemically oxidizable substances

TABLE 9

| | Outlet of step II-(i) (mg/l) | | | Outlet of step II-(ii) (mg/l) | |
|---|---|---|---|---|---|
| Ex. | COD components | NH$_3$—N | Catalyst in step II-(ii) | COD components | NH$_3$—N |
| 13 | 2905 | 3085 | 2% Ruthenium | 89 | 41 |
| 14 | " | " | " | " | " |
| 15 | " | " | " | " | " |
| 16 | " | " | " | " | " |
| 17 | " | " | " | " | " |
| 18 | " | " | " | " | " |
| 19 | " | " | " | " | " |
| 20 | " | " | " | " | " |
| 21 | " | " | " | " | " |
| 22 | " | " | " | " | " |

TABLE 10

| | Catalyst in step | Outlet of step II-(iii) (mg/l) | | Outlet of step II-(iv) (mg/l) | | |
|---|---|---|---|---|---|---|
| Ex. | II-(iii) | COD components | NH$_3$—N | COD components | NH$_3$—N | SS* |
| 13 | 2% Palladium | 8 | Trace | Less than 1.0 | Trace | Trace |
| 14 | 2% Rhodium | 4 | " | " | " | " |
| 15 | 1% Iridium | 9 | " | " | " | " |
| 16 | 0.5% Platinum | 12 | " | " | " | " |
| 17 | 1.5% Gold | 16 | Less than 1.0 | " | " | " |
| 18 | 10% Iron | 23 | " | " | " | " |
| 19 | 20% Cobalt | 20 | " | " | " | " |
| 20 | 20% Nickel | 20 | " | " | " | " |
| 21 | 10% Copper | 20 | 2.0 | " | " | " |
| 22 | 5% Tungsten | 24 | 2.5 | " | " | " |

*SS = Suspended solids

EXAMPLE 23

Sludge sewage in the form of concentrated liquid having the components and properties shown below in Table 11 was subjected to liquid phase oxidation by the process II according to the mode illustrated in FIG. 2. The treatment conditions were the same as those in Example 2 except that air was fed in an amount corresponding to 1.2 times the theoretical oxygen amount.

Table 12 below shows the quality of water treated in the steps.

TABLE 12

| | Outlet of step II-(i) | Outlet of step II-(ii) | Outlet of step II-(iii) | Outlet of step II-(iv) |
|---|---|---|---|---|
| pH | 7.9 | 9.4 | 7.6 | 7.4 |
| COD components (mg/l) | 5980 | 420 | 18 | Less than 1.0 |
| NH$_3$—N (mg/l) | 1455 | 295 | Trace | Trace |
| Total-N (mg/l) | 1990 | 305 | 8.9 | Less than 1.0 |

TABLE 12-continued

|  | Outlet of step II-(i) | Outlet of step II-(ii) | Outlet of step II-(iii) | Outlet of step II-(iv) |
|---|---|---|---|---|
| BOD components* (mg/l) | 9900 | 290 | 14 | Less than 1.0 |
| Suspended solids (mg/l) | 8200 | 803 | 600 | Trace |
| Total oxygen demand (mg/l) | 15030 | 1300 | 42 | Less than 1.0 |

*BOD components = biochemically oxidizable substances

The suspended solids in the water being run off from the outlet of the step II-(iii) were analyzed and found to contain 98% nonflammable components. Accordingly the water being treated was fed to a high pressure sedimentation tank (unillustrated) disposed on an intermediate location on the line 85 in FIG. 2 where the suspended solids were separated. After separation, the water was admitted to the reverse osmosis device 59.

None of $NH_3$, $SO_x$ and $NO_x$ were detected in the gas drawn off from the gas-liquid separator 53.

EXAMPLE 24

Raw human waste was subjected to liquid phase oxidation by the process III according to the mode shown in FIG. 3. The components and properties of the human waste used were the same as those used in Example 1.

Step III-(i)

To the raw human waste was added a 20% aqueous solution of sodium hydroxide to adjust the pH of the waste to about 9. The mixture was fed to a lower portion of the first reaction zone 21 at a space velocity of 2.0 l/hr (based on an empty column) and a mass velocity of 2.39 t/m² hr. Air was introduced into the lower portion of the first reaction zone 21 at a space velocity of 89.8 l/hr (based on an empty column, under standard conditions). The waste was subjected in this state to liquid phase oxidation without a catalyst at a temperature of 280° C. and pressure of 90 kg/cm²·G.

Table 13 below shows the components and properties of the waste treated in this step.

TABLE 13

| pH | 7.5 |
|---|---|
| COD components (mg/l) | 2905 |
| $NH_3$—N (mg/l) | 3085 |
| Total-N (mg/l) | 4090 |
| BOD components* (mg/l) | 9220 |
| Suspended solids (mg/l) | 11400 |
| Total oxygen demand (mg/l) | 14600 |
| Total-C (mg/l) | 3680 |
| Phosphorus (mg/l) | 95 |

*BOD components = biochemically oxidizable substances Step III-(ii)

The waste treated in the step III-(i) was supplied to the second reaction zone 22 containing a titania honeycomb structure with square cell apertures (3.5 mm in length of one side) having a cell pitch of 4.5 mm and an aperture ratio of 59.3% such that the empty column volume was equivalent to that in the step III-(i). After addition of a 20% aqueous solution of sodium hydroxide, the waste was subjected to liquid phase oxidation. The reaction temperature and pressure were the same as those in the step III-(i).

Table 14 below shows the components and properties of the waste thus treated.

TABLE 14

| pH | 6.9 |
|---|---|
| COD components (mg/l) | 1519 |
| $NH_3$—N (mg/l) | 3000 |
| Total-N (mg/l) | 4000 |
| BOD components* (mg/l) | 3340 |

TABLE 14-continued

| Suspended solids (mg/l) | 6200 |
|---|---|
| Total oxygen demand (mg/l) | 9800 |
| Total-C (mg/l) | 1900 |
| Phosphorus (mg/l) | 64 |

*BOD components = biochemically oxidizable substances Step III-(iii)

The waste treated in the step III-(ii) was fed to the third reaction zone 39 containing a catalyst supported by the same titania honeycomb structure as used in the step III-(ii) and composed of 2% by weight of palladium based on the weight of the honeycomb structure such that the empty column volume was equivalent to that in the steps III-(i) and III-(ii). The waste treated in the step III-(ii) was further subjected in the reaction zone 39 to liquid phase oxidation at a temperature of 280° C. and pressure of 90 kg/·cm³ G.

Table 15 below shows the quality of water resulting from this step. The water obtained was so decolorized and deodorized as to resemble tap water in appearance.

TABLE 15

| pH | 7.3 |
|---|---|
| COD components (mg/l) | 19 |
| $NH_3$—N (mg/l) | Trace |
| Total-N (mg/l) | 10 |
| BOD components* (mg/l) | 20 |
| Suspended solids (mg/l) | 21 |
| Total oxygen demand (mg/l) | 33 |
| Total-C (mg/l) | 12 |
| Phosphorus | 16 |

*BOD components = biochemically oxidizable substances Step III-(iv)

The water obtained in the step III-(iii) was cooled at the heat exchanger 13 and at the cooler 49, and fed to the gas-liquid separator 53. The liquid from the separator was introduced into the reverse osmosis device 59 under a pressure adjusted to 65 kg/cm². Thus 85 parts by weight of clarified water and 15 parts by weight of concentrated liquid per 100 parts by weight of the liquid supplied were obtained in the reverse osmosis device 59.

Table 16 below shows the quality of clarified water.

TABLE 16

| pH | 7.1 |
|---|---|
| COD components (mg/l) | Less than 1.0 |
| $NH_3$—N (mg/l) | Trace |
| Total-N (mg/l) | Less than 1.0 |
| BOD components* (mg/l) | Less than 1.0 |
| Suspended solids (mg/l) | Trace |

*BOD components = biochemically oxidizable substances

The concentrated liquid was returned by way of the line 63 to the waste water tank 1.

The gas run off from the gas-liquid separator 53 was found to contain less than 0.01 ppm of $NH_3$ and less than 0.01 ppm of $SO_x$, but no amount of $NO_x$ was detected.

The waste water containing suspended solids in a high concentration was treated for 5,000 hours but involved no precipitation nor deposition of solids on the catalyst or no reduction in decomposition efficiency of components. Thus subsequent treatment proceeded without trouble.

EXAMPLES 25

Raw human waste was subjected to liquid phase oxidation by the process IV according to the mode shown in FIG. 4. The raw human waste used had the same components and properties as those of the waste used in Example 1.

The reaction in the step IV-(i) was carried out in the same manner as in the step III-(i) of Example 24.

The amounts of carriers or catalysts used in the steps IV-(ii), IV-(iii) and IV-(iv) were such that the empty column volume was equivalent to that in the step III-(ii) of Example 24. The steps IV-(iii) and IV-(iv) each employed a catalyst composed of 2% by weight of ruthenium supported by a titania honeycomb carrier having the same characteristics as the honeycomb structure used in Example 24 or zirconia granular carrier 5 mm in diameter.

The reactions in the steps IV-(i), IV-(ii), IV-(iii) and and IV-(iv) were carried out all at a temperature of 250° C. and pressure of 70 kg/cm$^2$·G. The liquid space velocity was 1.0 l/hr (based on an empty column) in the steps IV-(i) and IV-(ii), and 0.67 l/hr (based on an empty column) in the steps IV-(iii) and IV-(iv) as combined. The catalysts were used in the steps IV-(iii) and IV-(iv) in a ratio of 1:1. The step IV-(ii) employed a zirconia honeycomb structure having the same characteristics as that used in Example 24 such that the empty colum volume was equivalent to that in the step IV-(i).

The catalysts used in the steps IV-(iii) and IV-(iv) are shown below in Table 18. The step IV-(iii) employed a catalyst supported by a honeycomb structure of the same type as used in Example 24 and the step IV-(iv) used a catalyst supported by a spherical carrier of zirconia 5 mm in diameter and composed of 2% by weight of palladium or ruthenium based on the weight of the carrier.

The other conditions were the same as those in Example 25. The quality of water obtained in the steps IV-(iii) and IV-(iv) is also shown below in Table 18.

TABLE 18

| Ex. | Catalyst in step IV-(iii) | Outlet of step IV-(iii) (mg/l) | | Catalyst in step VI-(iv) | Outlet of step IV-(iv) (mg/l) | |
|---|---|---|---|---|---|---|
| | | COD components | NH$_3$—N | | COD components | NH$_3$—N |
| 26 | 2.5% Rhodium | 405 | 340 | 2% Palladium | 16 | Trace |
| 27 | 1.5% Palladium | 389 | 270 | " | 13 | " |
| 28 | 2.5% Iridium | 470 | 395 | " | 18 | " |
| 29 | 1.0% Platinum | 350 | 305 | " | 10 | " |
| 30 | 15% Cobalt | 690 | 610 | " | 13 | 2.0 |
| 31 | 15% Nickel | 590 | 580 | " | 13 | 1.0 |
| 32 | 5% Tungsten | 880 | 2015 | 2% Ruthenium | 29 | Trace |
| 33 | 5% Copper | 820 | 1816 | " | 27 | " |
| 34 | 0.5% Iron | 998 | 1900 | " | 31 | " |
| 35 | 0.5% Gold | 390 | 302 | " | 19 | " |

A 20% aqueous solution of sodium hydroxide was supplied to the inlets of the steps IV-(ii) and IV-(iii) to adjust the pH of the water to 7.5 at the outlet of the step IV-(iv).

Table 17 below shows the quality of water at each outlet of the steps.

TABLE 17

| | Outlet of step IV-(i) | Outlet of step IV-(ii) | Outlet of step IV-(iii) | Outlet of step IV-(iv) |
|---|---|---|---|---|
| pH | 7.5 | 9.2 | 9.1 | 7.5 |
| COD components (mg/l) | 2905 | 1500 | 400 | 15 |
| NH$_3$—N (mg/l) | 3080 | 2990 | 395 | Trace |
| Total-N (mg/l) | 4090 | 3990 | 410 | Trace |
| BOD components* (mg/l) | 9220 | 3005 | 390 | 14 |
| Suspended solids (mg/l) | 11400 | 5900 | 1105 | Trace |
| Total oxygen demand (mg/l) | 14600 | 9300 | 1300 | 17 |
| Total-C (mg/l) | 3680 | 1826 | 240 | 6 |
| Phosphorus (mg/l) | 95 | 60 | 20 | 5 |

*BOD components = biochemically oxidizable substances

None of NH$_3$, SO$_x$ and NO$_x$ were detected in the gas drawn off from the gas-liquid separator 53.

EXAMPLES 26 to 35

Human waste similar to that treated in Example 1 was subjected to liquid phase oxidation by the process IV according to the mode shown in FIG. 4.

EXAMPLES 36 to 40

Raw human waste was subjected to liquid phase oxidation in the same manner as in Example 27 except that the catalysts listed below in Table 19 were used in the step IV-(iv).

Table 19 also shows the quality of water treated in the steps.

None of NH$_3$, SO$_x$ and NO$_x$ were detected in the gas drawn off from the gas-liquid separator 53 in any of Examples 36 to 40.

TABLE 19

| Ex. | Catalyst in step II-(iv) | Outlet of step II-(iv) (mg/l) | | Outlet of step II-(v) (mg/l) | |
|---|---|---|---|---|---|
| | | COD components | NH$_3$—N | COD components | NH$_3$—N |
| 36 | 1% Iridium | 36 | 3.2 | Less than 1.0 | Less than 1.0 |
| 37 | 0.5% Platinum | 29 | 4.2 | " | " |

TABLE 19-continued

| Ex. | Catalyst in step II-(iv) | Outlet of step II-(iv) (mg/l) COD components | NH$_3$—N | Outlet of step II-(v) (mg/l) COD components | NH$_3$—N |
|---|---|---|---|---|---|
| 38 | 1% Gold | 37 | 4.9 | " | " |
| 39 | 1% Palladium | 21 | Trace | " | Trace |
| 40 | 1.5% Rhodium | 23 | 1.2 | " | " |

°SS = Suspended solids

EXAMPLE 41

Sludge sewage in the form of concentrated liquid having the components and properties shown below in Table 20 was subjected to liquid phase oxidation by the process IV according to the mode illustrated in FIG. 4. The treatment conditions were the same as those in Example 25 except that air was fed in an amount corresponding to 1.2 times the theoretical oxygen amount.

TABLE 20

| pH | 7.3 |
|---|---|
| COD components (mg/l) | 10200 |
| NH$_3$—N (mg/l) | 1500 |
| Total-N (mg/l) | 2000 |
| BOD components* (mg/l) | 22000 |
| Suspended solids (mg/l) | 26000 |
| Total oxygen demand (mg/l) | 53000 |

*BOD components = biochemically oxidizable substances

Table 21 below shows the quality of water treated in the steps.

TABLE 21

|  | Outlet of step IV-(i) | Outlet of step IV-(ii) | Outlet of step IV-(iii) | Outlet of step IV-(iv) |
|---|---|---|---|---|
| pH | 8.2 | 9.3 | 7.5 | 7.4 |
| COD components (mg/l) | 6005 | 5000 | 14 | Less than 1.0 |
| NH$_3$—N (mg/l) | 1455 | 1425 | Trace | Trace |
| Total-N (mg/l) | 1995 | 1902 | 10 | Less than 1.0 |
| BOD components* (mg/l) | 10100 | 8500 | 13 | Less than 1.0 |
| Suspended solids (mg/l) | 10200 | 7010 | 802 | 602 |
| Total oxygen demand (mg/l) | 17050 | 14025 | 39 | Less than 1.0 |

*BOD components = biochemically oxidizable substances

The suspended solids in the water being run off from the outlet of the step IV-(iii) were separated and the water was found to show the same appearance as that of tap water and to have been completely deodorized. The suspended solids at the outlet of the step IV-(iv) were analyzed and found to contain 98% nonflammable components.

None of NH$_3$, SO$_x$ and NO$_x$ were detected in the gas drawn off from the gas-liquid separator 53.

EXAMPLES 42 to 46

Raw human waste was subjected to liquid phase oxidation in the same manner as in Example 25 with the exception that the catalysts shown below in Tables 22 and 23 were used in the steps IV-(iii) and IV-(iv).

Tables 22 and 23 also indicate the quality of water treated in each step.

TABLE 22

| Ex. | Outlet of step IV-(ii) (mg/l) COD components | NH$_3$—N | Catalyst in step IV-(iii) | Outlet of step IV-(iii) (mg/l) COD components | NH$_3$—N |
|---|---|---|---|---|---|
| 42 | 15000 | 2990 | 2% Palladium | 340 | 260 |
| 43 | " | " | " | " | " |
| 44 | " | " | " | " | " |
| 45 | " | " | " | " | " |
| 46 | " | " | " | " | " |

TABLE 23

| Ex. | Catalyst in step IV-(iv) | Outlet of step IV-(iv) (mg/l) COD components | NH$_3$—N | Outlet of step IV-(v) (mg/l) COD components | NH$_3$—N | SS* |
|---|---|---|---|---|---|---|
| 42 | 10% Iron | 59 | 3.5 | Less than 1.0 | Trace | Trace |
| 43 | 20% Cobalt | 50 | 2 | " | " | " |
| 44 | 20% Nickel | 52 | Less than 1.0 | " | " | " |
| 45 | 10% Copper | 20 | " | " | " | " |
| 46 | 5% Tungsten | 22 | " | " | " | " |

*SS = Suspended solids

EXAMPLE 47

Raw human waste is subjected to liquid phase oxidation by the process V according to the mode shown in FIG. 5. The components and properties of the raw human waste used were substantially the same as those used in Example 1.

Step V-(i)

To the raw human waste was added a 20% aqueous solution of sodium hydroxide to adjust the pH of the waste to about 9. The mixture was fed to a lower portion of the first reaction zone 21 at a space velocity of 1.0 l/hr (based on an empty column) and a mass velocity of 2.39 t/m$^2$ hr. Air was introduced into the lower portion of the first reaction zone 21 at a space velocity of 89.8 l/hr (based on an empty column, under standard conditions). The reaction zone 21 was provided with a honeycomb structure made of titania with square cell apertures (3.5 mm in length of one side) having a cell pitch of 4.5 mm and an aperture ratio of 59.3% so that the liquid space velocity therein was 1.0 l/hr. The waste was subjected to liquid phase oxidation in this state at a temperature of 280° C. and pressure of 90 kg/cm$^2$·G.

Table 24 below shows the components and properties of the waste thus treated.

TABLE 24

| pH | 6.8 |
|---|---|
| COD components (mg/l) | 1500 |
| $NH_3$—N (mg/l) | 2995 |
| Total-N (mg/l) | 3997 |
| BOD components* (mg/l) | 3200 |
| Suspended solids (mg/l) | 5500 |
| Total oxygen demand (mg/l) | 9036 |
| Total-C (mg/l) | 1802 |
| Phosphorus (mg/l) | 50 |

*BOD components = biochemically oxidizable substances Step V-(ii)

The waste treated in the step V-(i) was supplied to the second reaction zone 39 containing a catalyst supported by the same titania carrier of honeycomb construction as used in the step V-(i) and composed of 2% by weight of ruthenium based on the weight of the carrier so that the empty column volume was equivalent to that in the step V-(i). To the reaction zone 39 was fed a 20% aqueous solution of sodium hydroxide. Then the waste was subjected to liquid phase oxidation. The reaction temperature and pressure were the same as those in the step V-(i).

Table 25 below shows the components and properties of the waste thus treated at this step.

The water treated in this step had the same appearance as tap water and was completely deodorized.

TABLE 25

| pH | 7.2 |
|---|---|
| COD components (mg/l) | 19 |
| $NH_3$—N (mg/l) | Trace |
| Total-N (mg/l) | 12 |
| BOD components* (mg/l) | 20 |
| Suspended solids (mg/l) | 15 |
| Total oxygen demand (mg/l) | 30 |
| Total-C (mg/l) | 10 |
| Phosphorus (mg/l) | 9 |

*BOD components = biochemically oxidizable substances Step V-(iii)

The waste treated in the step V-(ii) was cooled at the heat exchanger 13 and at the cooler 49, and fed to the gas-liquid separator 53. The liquid from the separator was introduced into the reverse osmosis device 59 under a pressure adjusted to 65 kg/cm$^2$. Thus 85 parts by weight of clarified water and 15 parts by weight of concentrated liquid per 100 parts by weight of the liquid supplied were obtained in the reverse osmosis device 59.

Table 26 below shows the quality of clarified water.

TABLE 26

| pH | 7.2 |
|---|---|
| COD components (mg/l) | Less than 1.0 |
| $NH_3$—N (mg/l) | Trace |
| Total-N (mg/l) | Less than 1.0 |
| BOD components* (mg/l) | Less than 1.0 |
| Suspended solids (mg/l) | Trace |

*BOD components = biochemically oxidizable substances

The concentrated liquid was returned by way of the line 63 to the waste water tank 1.

The gas run off from the gas-liquid separator 53 was found to contain less than 0.01 ppm of $NH_3$ and less than 0.01 ppm of $SO_x$, but no amount of $NO_x$ was detected.

The raw human waste containing suspended solids in a high concentration was treated for 5,000 hours but involved no precipitation nor deposition of solids on the catalyst or no reduction in decomposition efficiency of components. Thus subsequent treatment proceeded without trouble.

EXAMPLE 48

Raw human waste was subjected to liquid phase oxidation by the process VI according to the mode shown in FIG. 6. The raw human waste used had the same components and properties as those of the waste used in Example 1.

The reactions in the steps VI-(i) and VI-(iv) were carried out in the same manner as those in the steps V-(i) and V-(iii) of Example 1 with the exception of using the reaction temperature of 250° C. and reaction pressure of 70 kg/cm$^2$·G.

The combined amount of catalysts used in the steps VI-(ii) and VI-(iii) was the same as the amount of catalyst in the step V-(ii) of Example 47. The catalyst composed of 2% by weight of palladium supported by a honeycomb carrier was used in the step VI-(ii) and a catalyst composed of 2% by weight of ruthenium supported by a titania granular carrier 5 mm in diameter in the step VI-(iii). The reaction temperature was 250° C. and the reaction pressure was 70 kg/cm$^3$·G in the steps VI-(ii) and VI-(iii).

A 20% aqueous solution of sodium hydroxide was supplied to the inlets of the steps VI-(ii) and VI-(iii) to adjust the pH of the water to 7.5 at the outlet of the step VI-(iii).

Table 27 below shows the quality of water at each outlet of the steps.

TABLE 27

|  | Outlet of step VI-(i) | Outlet of step VI-(ii) | Outlet of step VI-(iii) | Outlet of step VI-(iv) (Clarified water) |
|---|---|---|---|---|
| pH | 7.4 | 9.1 | 7.5 | 6.9 |
| COD components (mg/l) | 1803 | 350 | 13 | Less than 1.0 |
| $NH_3$—N (mg/l) | 3002 | 260 | Trace | Trace |
| Total-N (mg/l) | 4010 | 275 | 11 | Less than 1.0 |
| BOD components* (mg/l) | 3950 | 300 | 8 | " |
| Suspended solids (mg/l) | 6908 | 890 | Trace | Trace |
| Total oxygen demand (mg/l) | 10200 | 1095 | 16 | Less than 1.0 |
| Total-C (mg/l) | 2110 | 200 | 8 | " |
| Phosphorus (mg/l) | 60 | 20 | 3 | " |

*BOD components = biochemically oxidizable substances

None of $NH_3$, $SO_x$ and $NO_x$ were detected in the gas drawn off from the gas-liquid separator 53.

EXAMPLES 49 to 58

The same raw human waste as treated in Example 1 was subjected to liquid phase oxidation by the process VI according to the mode shown in FIG. 6.

The oxidation reactions were carried out in the same manner as in Example 48 with the exception of using the catalysts listed below in Table 28.

Table 28 also shows the quality of water treated in the steps VI-(ii) and VI-(iii).

TABLE 28

| Ex. | Catalyst in step VI-(ii) | Outlet of step VI-(ii) (mg/l) COD components | NH$_3$—N | Catalyst in step VI-(iii) | Outlet of step VI-(iii) (mg/l) COD components | NH$_3$—N |
|---|---|---|---|---|---|---|
| 49 | 2% Rhodium | 890 | 399 | 2% Ruthenium | 23 | Trace |
| 50 | 2% Ruthenium | 490 | 202 | " | 12 | " |
| 51 | 2% Iridium | 520 | 490 | " | 19 | " |
| 52 | 0.5% Platinum | 369 | 325 | " | 17 | " |
| 53 | 10% Cobalt | 720 | 620 | " | 21 | 2.9 |
| 54 | 10% Nickel | 700 | 590 | " | 21 | 2.2 |
| 55 | 10% Iron | 1899 | 1670 | " | 27 | Trace |
| 56 | 10% Copper | 1350 | 1841 | " | 20 | " |
| 57 | 5% Tungsten | 1030 | 1900 | " | 20 | " |
| 58 | 1.5% Gold | 800 | 590 | " | 25 | " |

The quality of water at the outlet of the step VI-(iv) in any of Examples 49 to 58 was almost at the same level as that in Example 48.

None of NH$_3$, SO$_x$ and NO$_x$ were detected in the gas drawn off from the gas-liquid separator 53.

EXAMPLES 59 to 68

The same raw human waste as used in Example 1 was subjected to liquid phase oxidation by the process VI according to the mode shown in FIG. 6.

The reactions of the steps VI-(i), VI-(ii) and VI-(iii) were carried out all at a temperature of 280° C. and pressure of 90 kg/cm$^2$·G.

The other conditions were the same as those in Example 48 with the exception of using different catalysts in the step VI-(ii) and VI-(iii). Tables 29 and 30 below show the quality of water treated in the steps and the catalysts used in the steps VI-(ii) and VI-(iii).

TABLE 29

| Ex. | Outlet of step VI-(i) (mg/l) COD components | NH$_3$—N | Catalyst in step VI-(ii) | Outlet of step VI-(ii) (mg/l) COD components | NH$_3$—N |
|---|---|---|---|---|---|
| 59 | 1500 | 2955 | 2% Ruthenium | 75 | 39 |
| 60 | " | " | " | " | " |
| 61 | " | " | " | " | " |
| 62 | " | " | " | " | " |
| 63 | " | " | " | " | " |
| 64 | " | " | " | " | " |
| 65 | " | " | " | " | " |
| 66 | " | " | " | " | " |
| 67 | " | " | " | " | " |
| 68 | " | " | " | " | " |

TABLE 30

| Ex. | Catalyst in step VI-(iii) | Outlet of step VI-(iii) (mg/l) COD components | NH$_3$—N | Outlet of step VI-(iv) (mg/l) COD components | NH$_3$—N | SS* |
|---|---|---|---|---|---|---|
| 59 | 2% Palladium | 7 | Trace | Less than 1.0 | Trace | Trace |
| 60 | 2% Rhodium | 4 | " | " | " | " |
| 61 | 1% Iridium | 8 | " | " | " | " |
| 62 | 0.5% Platinum | 11 | " | " | " | " |
| 63 | 1.5% Gold | 15 | Less than 1.0 | " | " | " |
| 64 | 10% Iron | 22 | 2.0 | " | " | " |
| 65 | 20% Cobalt | 20 | 2.0 | " | " | " |
| 66 | 20% Nickel | 19 | 2.0 | " | " | " |
| 67 | 10% Copper | 18 | 4.0 | " | " | " |
| 68 | 5% Tungsten | 23 | 3.5 | " | " | " |

*SS = Suspended solids

Substantially none of NH$_3$, SO$_x$ and NO$_x$ were detected in the gas drawn off from the gas-liquid separator 53 in any of Examples 59 to 68.

EXAMPLE 69

Sludge sewage in the form of concentrated liquid having the components and properties shown below in Table 31 was subjected to liquid phase oxidation by the process V according to the mode illustrated in FIG. 5. The treatment conditions were the same as those in Example 47 except that air was fed in an amount corresponding to 1.2 times the theoretical oxygen amount and that the liquid space velocity was 0.67 l/hr in the step V-(ii).

TABLE 31

| | |
|---|---|
| pH | 7.3 |
| COD components (mg/l) | 10200 |
| NH$_3$—N (mg/l) | 1500 |
| Total-N (mg/l) | 2000 |
| BOD components* (mg/l) | 22000 |
| Suspended solids (mg/l) | 26000 |
| Total oxygen demand (mg/l) | 53000 |

*BOD components = biochemically oxidizable substances

Table 32 below shows the quality of water treated in the steps.

TABLE 32

|  | Outlet of step V-(i) | Outlet of step V-(ii) | Outlet of step V-(iii) |
|---|---|---|---|
| pH | 9.5 | 6.9 | 6.9 |
| COD components (mg/l) | 5950 | 23 | Less than 1.0 |
| $NH_3$—N (mg/l) | 1400 | Trace | Trace |
| Total-N (mg/l) | 1590 | 10 | Less than 1.0 |
| BOD components (mg/l) | 9000 | 20 | Less than 1.0 |
| Suspended solids (mg/l) | 8100 | 600 | Trace |
| Total oxygen demand (mg/l) | 15000 | 30 | Less than 1.0 |

*BOD components = biochemically oxidizable substances

The suspended solids in the water being run off from the outlet of the step V-(ii) were analyzed and found to contain 98% nonflammable components. Accordingly the water being run off was fed to a high pressure sedimentation tank (unillustrated) disposed on an intermediate location on the line 57 in FIG. 5 where the suspended solids were separated. After separation, the water was admitted to the reverse osmosis device 59.

None of $NH_3$, $SO_x$ and $NO_x$ were detected in the gas drawn off from the gas-liquid separator 53.

EXAMPLE 70

Raw human waste is subjected to liquid phase oxidation by the process VII according to the mode shown in FIG. 7. The components and properties of the human waste used were the same as those used in Example 1.

Step VII-(i)

To the raw human waste was added a 20% aqueous solution of sodium hydroxide to adjust the pH of the waste to about 10. The mixture was fed to a lower portion of the first reaction zone 21 at a space velocity of 1.0 l/hr (based on an empty column) and a mass velocity of 2.39 t/m² hr. Air was introduced into the lower portion of the first reaction zone 21 at a space velocity of 89.8 l/hr (based on an empty column, under standard conditions). The first reaction zone 21 was charged with a catalyst supported by a titania honeycomb structure with square cell apertures (3.5 mm in length of one side) having a cell pitch of 4.5 mm and an aperture ratio of 59.3% and composed of 2% by weight of ruthenium based on the weight of the honeycomb structure. The waste was subjected in this state to liquid phase oxidation at a temperature of 250° C. and pressure of 70 kg/cm²·G.

Step VII-(ii)

The waste treated in the step VII-(i) was supplied to the second reaction zone 39 packed with a granular catalyst supported by a titania carrier 6 mm in particle size and composed of 2% by weight of ruthenium based on the weight of the carrier such that the empty column volumn was equivalent to that in the step VII-(i). After feed of a 20% aqueous solution of sodium hydroxide, the waste was subjected to liquid phase oxidation. The reaction temperature and pressure were the same as those in the step VII-(i).

Table 33 below shows the components and properties of the waste thus treated.

The water obtained in the step VII-(ii) had the same appearance as that of tap water and was completely deodorized.

TABLE 33

| pH | 7.7 |
|---|---|
| COD components (mg/l) | 6 |
| $NH_3$—N (mg/l) | Trace |
| Total-N (mg/l) | 8 |
| BOD components* (mg/l) | 8 |
| Suspended solids (mg/l) | Trace |
| Total oxygen demand (mg/l) | 8 |
| Total-C (mg/l) | 3 |
| Phosphorus (mg/l) | Trace |

*BOD components = biochemically oxidizable substances Step VII-(iii)

The waste treated in the step VII-(ii) was cooled at the heat exchanger 13 and at the cooler 49, and fed to the gas-liquid separator 53. The liquid from the separator was introduced into the reverse osmosis device 59 under a pressure adjusted to 65 kg/cm². Thus 85 parts by weight of clarified water and 15 parts by weight of concentrated liquid per 100 parts by weight of the liquid supplied were obtained in the reverse osmosis device 59.

Table 34 below shows the quality of clarified water.

TABLE 34

| pH | 7.7 |
|---|---|
| COD components (mg/l) | Less than 1.0 |
| $NH_3$—N (mg/l) | Trace |
| Total-N (mg/l) | 3.0 |
| BOD components* (mg/l) | Less than 1.0 |
| Suspended solids (mg/l) | Trace |

*BOD components = biochemically oxidizable substances

The concentrated liquid was returned by way of the line 63 to the waste water tank 1.

The gas run off from the gas-liquid separator 53 was found to contain less than 0.01 ppm of $NH_3$ and less than 0.01 ppm of $SO_x$, but no amount of $NO_x$ was detected.

The water containing suspended solids in a high concentration was treated for 5,000 hours but involved no precipitation nor deposition of solids on the catalyst or no reduction in decomposition efficiency of components. Thus subsequent treatment proceeded without trouble.

EXAMPLES 71 to 80

Raw human waste was subjected to liquid phase oxidation in the same manner as in Example 70 except that the catalysts listed below in Tables 35 and 36 were used in the steps VII-(i) and VII-(ii).

Tables 35 and 36 also show the quality of water treated in the steps.

None of $NH_3$, $SO_x$ and $NO_x$ were detected in the gas drawn off from the gas-liquid separator 53 in any of Examples 71 to 80.

TABLE 35

| | | Outlet of step VII-(i) | |
|---|---|---|---|
| Ex. | Catalyst in step VII-(1) | COD components | (mg/l) $NH_3$—N |
| 71 | 2.5% Rhodium | 490 | 402 |
| 72 | 2% Palladium | 350 | 202 |
| 73 | 2.5% Iridium | 400 | 383 |
| 74 | 1% Platinum | 333 | 303 |
| 75 | 15% Cobalt | 650 | 601 |
| 76 | 15% Nickel | 585 | 509 |
| 77 | 1% Gold | 841 | 750 |
| 78 | 5% Tungsten | 1205 | 1000 |
| 79 | 10% Copper | 975 | 1250 |

TABLE 35-continued

| Ex. | Catalyst in step VII-(1) | Outlet of step VII-(i) | |
|---|---|---|---|
| | | COD components | (mg/l) NH$_3$—N |
| 80 | 10% Iron | 1200 | 950 |

TABLE 36

| Ex. | Catalyst in step VII-(ii) | Outlet of step VII-(ii) (mg/l) | | Outlet of step VII-(iii) (mg/l) | | |
|---|---|---|---|---|---|---|
| | | COD components | NH$_3$—N | COD components | NH$_3$—N | SS* |
| 71 | 2% Ruthenium | 19 | Trace | Less than 1.0 | Trace | Trace |
| 72 | 2% Ruthenium | 15 | " | " | " | " |
| 73 | 2% Palladium | 19 | " | " | " | " |
| 74 | 2% Iridium | 21 | " | " | " | " |
| 75 | 2% Ruthenium | 22 | Less than 1.0 | " | " | " |
| 76 | 15% Nickel | 39 | 28.0 | " | " | " |
| 77 | 2% Ruthenium | 24 | Trace | " | " | " |
| 78 | " | 39 | " | " | " | " |
| 79 | " | 33 | " | " | " | " |
| 80 | " | 25 | " | " | " | " |

*SS = Suspended solids

EXAMPLE 81

Sludge sewage in the form of concentrated liquid having the components and properties shown below in Table 37 was subjected to liquid phase oxidation by the process VII. The treatment conditions were the same as those in Example 70 except that air was fed in an amount corresponding to 1.2 times the theoretical oxygen amount.

TABLE 37

| pH | 7.3 |
|---|---|
| COD components (mg/l) | 10200 |
| NH$_3$—N (mg/l) | 1500 |
| Total-N (mg/l) | 2000 |
| BOD components* (mg/l) | 22000 |
| Suspended solids (mg/l) | 26000 |
| Total oxygen demand (mg/l) | 53000 |

*BOD components = biochemically oxidizable substances

Table 38 below shows the quality of water treated in the steps.

TABLE 38

| | Outlet of step VII-(i) | Outlet of step VII-(ii) |
|---|---|---|
| pH | 9.2 | 7.1 |
| COD components (mg/l) | 46 | 7 |
| NH$_3$—N (mg/l) | Trace | Trace |
| Total-N (mg/l) | 25 | 10 |
| BOD components* (mg/l) | 40 | 8 |
| Suspended solids (mg/l) | 600 | 595 |
| Total oxygen demand (mg/l) | 50 | 20 |

*BOD components = biologically oxidizable substances

The suspended solids in the water being run off from the outlet of the step VII-(ii) were analyzed and found to show the same appearance as tap water and to have been completely deodorized.

None of NH$_3$, SO$_x$ and NO$_x$ were detected in the gas drawn off from the gas-liquid separator 53.

We claim:

1. A process for treating waste water by wet oxidations which contains at least two kinds of components among suspended solids, ammonia and COD components, the process comprising the steps of;
   (i) subjecting waste water to liquid phase oxidation in the absence of a catalyst and in the presence of an oxygen-containing gas, and
   (ii) subjecting the water from the step (i) to liquid phase oxidation in the presence of an oxygen-containing gas and a catalyst supported by a carrier of honeycomb construction and comprising at least one of iron, cobalt, nickel, ruthenium, rhodium, palladium, iridium, platinum, copper, gold, tungsten and compounds thereof insoluble or sparingly soluble in water.

2. A process according to claim 1 wherein the oxygen-containing gas is used in an amount corresponding to about 1 to about 1.5 times the theoretical amount of oxygen required for the oxidation of the suspended solids, ammonia and COD components to nitrogen, CO$_2$ and water.

3. A process according to claim 2 wherein the oxygen-containing gas is used in an amount to corresponding to about 1.05 to about 1.2 times the theoretical oxygen amount.

4. A process according to claim 2 wherein the oxygen-containing gas is fed to the step (i) in an amount corresponding to about 0.4 to about 0.7 time the theoretical oxygen amount.

5. A process according to claim 1 wherein the reaction temperature in the step (i) for liquid phase oxidation is in the range of about 100° to about 370° C.

6. A process according to claim 5 wherein the reaction temperature in the step (i) for liquid phase oxidation is in the range of about 200° to about 300° C.

7. A process according to claim 1 wherein the carrier of honeycomb construction used in the step (ii) for liquid phase oxidation is about 200 to about 800 m$^2$/m$^3$ in area per unit volume and about 40 to about 80% in aperture ratio.

8. A process according to claim 1 wherein the active component of the catalyst in the step (ii) for liquid phase oxidation comprises at least one of iron, cobalt, nickel, ruthenium, rhodium, palladium, iridium, platinum, copper, gold and tungsten.

9. A process according to claim 1 wherein the active component of the catalyst in the step (ii) for liquid phase oxidation comprises at least one of compounds insoluble or sparingly soluble in water of iron, cobalt, nickel, ruthenium, rhodium, palladium, iridium, platinum, copper, gold and tungsten.

10. A process according to claim 9 wherein the active component of the catalyst in the step (ii) for liquid phase oxidation comprises at least one of oxides of iron, cobalt, nickel, ruthenium, rhodium, palladium, iridium, platinum, copper, gold and tungsten.

11. A process according to claim 9 wherein the active component of the catalyst in the step (ii) for liquid phase oxidation comprises at least one of ruthenium dichloride, platinum dichloride, ruthenium sulfide and rhodium sulfide.

12. A process according to claim 1 wherein the reaction temperature in the step (ii) for liquid phase oxidation is in the range of about 100° to about 370° C.

13. A process according to claim 12 wherein the reaction temperature in the step (ii) for liquid phase oxidation is in the range of about 200° to about 300° C.

14. A process for treating waste water by wet oxidations which contains at least two kinds of components among suspended solids, ammonia and COD components, the process comprising the steps of;
(i) subjecting waste water to liquid phase oxidation in the absence of a catalyst and in the presence of an oxygen-containing gas,
(ii) subjecting the water from the step (i) to liquid phase oxidation in the presence of an oxygen-containing gas and a catalyst supported by a carrier of honeycomb construction and comprising at least one of iron, cobalt, nickel, ruthenium, rhodium, palladium, iridium, platinum, copper, gold, tungsten and compounds thereof insoluble or sparingly soluble in water, and
(iii) subjecting the water from the step (ii) to liquid phase oxidation in the presence of an oxygen-containing gas and a catalyst supported by a granular carrier and comprising at least one of iron, cobalt, nickel, ruthenium, rhodium, palladium, iridium, platinum, copper, gold, tungsten and compounds thereof insoluble or sparingly soluble in water.

15. A process according to claim 14 wherein the oxygen-containing gas is used in an amount corresponding to about 1 to about 1.5 times the theoretical amount of oxygen required for the oxidation of the suspended solids, ammonia and COD components to nitrogen, $CO_2$ and water.

16. A process according to claim 15 wherein the the oxygen-containing gas is used in an amount corresponding to about 1.05 to about 1.2 the times the theoretical oxygen amount.

17. A process according to claim 14 wherein the reaction temperature in the step (i) for liquid phase oxidation is in the range of about 100° to about 370° C.

18. A process according to claim 17 wherein the reaction temperature in the step (i) for liquid phase oxidation is in the range of about 200° to about 300° C.

19. A process according to claim 14 wherein the carrier of honeycomb construction used in the step (ii) for liquid phase oxidation is about 200 to about 800 $m^2/m^3$ in area per unit volume and about 40 to about 80% in aperture ratio.

20. A process according to claim 14 wherein the active component of the catalyst in the step (ii) for liquid phase oxidation comprises at least one of iron, cobalt, nickel, ruthenium, rhodium, palladium, iridium, platinum, copper, gold and tungsten.

21. A process according to claim 14 wherein the active component of the catalyst in the step (ii) for liquid phase oxidation comprises at least one of compounds insoluble or sparingly soluble in water of iron, cobalt, nickel, ruthenium, rhodium, palladium, iridium, platinum, copper, gold and tungsten.

22. A process according to claim 21 wherein the active component of the catalyst in the step (ii) for liquid phase oxidation comprises at least one of oxides of iron, cobalt, nickel, ruthenium, rhodium, palladium, iridium, platinum, copper, gold and tungsten.

23. A process according to claim 14 wherein the active component of the catalyst in the step (ii) for liquid phase oxidation comprises at least one of ruthenium dichloride, platinum dichloride, ruthenium sulfide and rhodium sulfide.

24. A process according to claim 14 wherein the reaction temperature in the step (ii) for liquid phase oxidation is in the range of about 100° to about 300° C.

25. A process according to claim 24 wherein the reaction temperature in the step (ii) for liquid phase oxidation is in the range of about 200° to about 290° C.

26. A process according to claim 14 wherein the reaction temperature in the step (iii) for liquid phase oxidation is in the range of about 100° to about 300° C.

27. A process according to claim 26 wherein the reaction temperature in the step (iii) for liquid phase oxidation is in the range of about 200° to about 290° C.

28. A process according to claim 14 wherein the active component of the catalyst in the step (iii) for liquid phase oxidation comprises at least one of iron, cobalt, nickel, ruthenium, rhodium, palladium, iridium, platinum, copper, gold and tungsten.

29. A process according to claim 14 wherein the active component of the catalyst in the step (iii) for liquid phase oxidation comprises at least one of compounds insoluble or sparingly soluble in water of iron, cobalt, nickel, ruthenium, rhodium, palladium, iridium, platinum, copper, gold and tungsten.

30. A process according to claim 29 wherein the active component of the catalyst in the step (iii) for liquid phase oxidation comprises at least one of oxides of iron, cobalt, nickel, ruthenium, rhodium, palladium, iridium, platinum, copper, gold and tungsten.

31. A process according to claim 29 wherein the active component of the catalyst in the step (iii) for liquid phase oxidation comprises at least one of ruthenium dichloride, platinum dichloride, ruthenium sulfide and rhodium sulfide.

32. A process for treating waste water by wet oxidations which contains at least two kinds of components among suspended solids, ammonia and COD components, the process comprising the steps of;
(i) subjecting waste water to liquid phase oxidation in the absence of a catalyst and in the presence of an oxygen-containing gas,
(ii) subjecting the water from the step (i) to liquid phase oxidation in the presence of a honeycomb structure and an oxygen-containing gas, and
(iii) subjecting the water from the step (ii) to liquid phase oxidation in the presence of an oxygen-containing gas and a catalyst supported by a carrier of honeycomb construction and comprising at least one of iron, cobalt, nickel, ruthenium, rhodium, palladium, iridium, platinum, copper, gold, tungsten and compounds thereof insoluble or sparingly soluble in water.

33. A process according to claim 32 wherein the oxygen-containing gas is used in an amount corresponding to about 1 to about 1.5 times the theoretical amount of oxygen required for the oxidation of the suspended solids, ammonia and COD components to nitrogen, $CO_2$ and water.

34. A process according to claim 33 wherein the oxygen-containing gas is used in an amount to corresponding to about 1.05 to about 1.2 times the theoretical oxygen amount.

35. A process according to claim 32 wherein the reaction temperature in the step (i) for liquid phase oxidation is in the range of about 100° to about 370° C.

36. A process according to claim 35 wherein the reaction temperature in the step (i) for liquid phase oxidation is in the range of about 200° to about 300° C.

37. A process according to claim 32 wherein the honeycomb structure used in the step (ii) for liquid phase oxidation is about 200 to about 800 $m^2/m^3$ in area per unit volume and about 40 to about 80% in aperture ratio.

38. A process according to claim 32 wherein the reaction temperature in the step (ii) for liquid phase oxidation is in the range of about 100° to about 370° C.

39. A process according to claim 38 wherein the reaction temperature in the step (ii) for liquid phase oxidation is in the range of about 200° to about 300° C.

40. A process according to claim 32 wherein the reaction temperature in the step (iii) for liquid phase oxidation is in the range of about 100° to about 300° C.

41. A process according to claim 40 wherein the reaction temperature in the step (iii) for liquid phase oxidation is in the range of about 200° to about 290° C.

42. A process according to claim 32 wherein the carrier of honeycomb structure used in the step (iii) for liquid phase oxidation is about 200 to about 800 $m^2/m^3$ in area per unit volume and about 40 to about 80% in aperture ratio.

43. A process according to claim 32 wherein the active component of the catalyst in the step (iii) for liquid phase oxidation comprises at least one of iron, cobalt, nickel, ruthenium, rhodium, palladium, iridium, platinum, copper, gold and tungsten.

44. A process according to claim 32 wherein the active component of the catalyst in the step (iii) for liquid phase oxidation comprises at least one of compounds insoluble or sparingly soluble in water of iron, cobalt, nickel, ruthenium, rhodium, palladium, iridium, platinum, copper, gold and tungsten.

45. A process according to claim 44 wherein the active component of the catalyst in the step (iii) for liquid phase oxidation comprises at least one of oxides of iron, cobalt, nickel, ruthenium, rhodium, palladium, iridium, platinum, copper, gold and tungsten.

46. A process according to claim 44 wherein the active component of the catalyst in the step (iii) for liquid phase oxidation comprises at least one of ruthenium dichloride, platinum dichloride, ruthenium sulfide and rhodium sulfide.

47. A process for treating waste water by wet oxidations which contains at least two kinds of components among suspended solids, ammonia and COD components, the process comprising the steps of;
(i) subjecting waste water to liquid phase oxidation in the absence of a catalyst and in the presence of an oxygen-containing gas,
(ii) subjecting the water from the step (i) to liquid phase oxidation in the presence of a honeycomb structure and an oxygen-containing gas,
(iii) subjecting the water from the step (ii) to liquid phase oxidation in the presence of an oxygen-containing gas and a catalyst supported by a carrier of honeycomb construction and comprising at least one of iron, cobalt, nickel, ruthenium, rhodium, palladium, iridium, platinum, copper, gold, tungsten and compounds thereof insoluble or sparingly soluble in water, and
(iv) subjecting the water from the step (iii) to liquid phase oxidation in the presence of an oxygen-containing gas and a catalyst supported by a granular carrier and comprising at least one of iron, cobalt, nickel, ruthenium, rhodium, palladium, iridium, platinum, copper, gold, tungsten and compounds thereof insoluble or sparingly soluble in water.

48. A process according to claim 47 wherein the oxygen-containing gas is used in an amount corresponding to about 1 to about 1.5 times the theoretical amount of oxygen required for the oxidation of the suspended solids, ammonia and COD components to nitrogen, $CO_2$ and water.

49. A process according to claim 48 wherein the oxygen-containing gas is used in an amount corresponding to about 1.05 to about 1.2 times the theoretical oxygen amount.

50. A process according to claim 47 wherein the reaction temperature in the step (i) for liquid phase oxidation is in the range of about 100° to about 370° C.

51. A process according to claim 50 wherein the reaction temperature in the step (i) for liquid phase oxidation is in the range of about 200° to about 300° C.

52. A process according to claim 47 wherein the honeycomb structure used in the step (ii) for liquid phase oxidation is about 200 to about 800 $m^2/m^3$ in area per unit volume and about 40 to about 80% in aperture ratio.

53. A process according to claim 47 wherein the reaction temperature in the step (ii) for liquid phase oxidation is in the range of about 100° to about 300° C.

54. A process according to claim 53 wherein the reaction temperature in the step (ii) for liquid phase oxidation is in the range of about 200° to about 290° C.

55. A process according to claim 47 wherein the reaction temperature in the step (iii) for liquid phase oxidation is in the range of about 100° to about 300° C.

56. A process according to claim 55 wherein the reaction temperature in the step (iii) for liquid phase oxidation is in the range of about 200° to about 290° C.

57. A process according to claim 47 wherein the carrier of honeycomb structure used in the step (iii) for liquid phase oxidation is about 200 to about 800 $m^2/m^3$ in area per unit volume and about 40 to about 80% in aperture ratio.

58. A process according to claim 47 wherein the active component of the catalyst in the step (iii) for liquid phase oxidation comprises at least one of iron, cobalt, nickel, ruthenium, rhodium, palladium, iridium, platinum, copper, gold and tungsten.

59. A process according to claim 47 wherein the active component of the catalyst in the step (iii) for liquid phase oxidation comprises at least one of compounds insoluble or sparingly soluble in water of iron, cobalt, nickel, ruthenium, rhodium, palladium, iridium, platinum, copper, gold and tungsten.

60. A process according to claim 59 wherein the active component of the catalyst in the step (iii) for liquid phase oxidation comprises at least one of oxides of iron, cobalt, nickel, ruthenium, rhodium, palladium, iridium, platinum, copper, gold and tungsten.

61. A process according to claim 59 wherein the active component of the catalyst in the step (iii) for liquid phase oxidation comprises at least one of ruthenium dichloride, platinum dichloride, ruthenium sulfide and rhodium sulfide.

62. A process according to claim 47 wherein the reaction temperature in the step (iv) for liquid phase oxidation is in the range of about 100° to about 300° C.

63. A process according to claim 62 wherein the reaction temperature in the step (iv) for liquid phase oxidation is in the range of about 200° to about 290° C.

64. A process according to claim 47 wherein the active component of the catalyst in the step (iv) for liquid phase oxidation comprises at least one of iron, cobalt, nickel, ruthenium, rhodium, palladium, iridium, platinum, copper, gold and tungsten.

65. A process according to claim 47 wherein the active component of the catalyst in the step (iv) for liquid phase oxidation comprises at least one of compounds insoluble or sparingly soluble in water of iron, cobalt, nickel, ruthenium, rhodium, palladium, iridium, platinum, copper, gold and tungsten.

66. A process according to claim 47 wherein the active component of the catalyst in the step (iv) for liquid phase oxidation comprises at least one of oxides of iron, cobalt, nickel, ruthenium, rhodium, palladium, iridium, platinum, copper, gold and tungsten.

67. A process according to claim 65 wherein the active component of the catalyst in the step (iv) for liquid phase oxidation comprises at least one of ruthenium dichloride, platinum dichloride, ruthenium sulfide and rhodium sulfide.

68. A process for treating waste water by wet oxidations which contains at least two kinds of components among suspended solids, ammonia and COD components, the process comprising the steps of;
  (i) subjecting waste water to liquid phase oxidation in the presence of a honeycomb structure and an oxygen-containing gas, and
  (ii) subjecting the water from the step (i) to liquid phase oxidation in the presence of an oxygen-containing gas and a catalyst supported by a carrier of honeycomb construction and comprising at least one of iron, cobalt, nickel, ruthenium, rhodium, palladium, iridium, platinum, copper, gold, tungsten and compounds thereof insoluble or sparingly soluble in water.

69. A process according to claim 68 wherein the oxygen-containing gas is used in an amount corresponding to about 1 to about 1.5 times the theoretical amount of oxygen required for the oxidation of the suspended solids, ammonia and COD components to nitrogen, $CO_2$ and water.

70. A process according to claim 69 wherein the oxygen-containing gas is used in an amount corresponding to about 1.05 to about 1.2 times the theoretical oxygen amount.

71. A process according to claim 68 wherein the reaction temperature in the step (i) for liquid phase oxidation is in the range of about 100° to about 370° C.

72. A process according to claim 71 wherein the reaction temperature in the step (i) for liquid phase oxidation is in the range of about 200° to about 300° C.

73. A process according to claim 68 wherein the honeycomb structure used in the step (i) for liquid phase oxidation is about 200 to about 800 $m^2/m^3$ in area per unit volume and about 40 to about 80% in aperture ratio.

74. A process according to claim 68 wherein the carrier of honeycomb construction used in the step (ii) for liquid phase oxidation is about 200 to about 800 $m^2/m^3$ in area per unit volume and about 40 to about 80% in aperture ratio.

75. A process according to claim 68 wherein the active component of the catalyst in the step (ii) for liquid phase oxidation comprises at least one of iron, cobalt, nickel, ruthenium, rhodium, palladium, iridium, platinum, copper, gold and tungsten.

76. A process according to claim 68 wherein the active component of the catalyst in the step (ii) for liquid phase oxidation comprises at least one of compounds insoluble or sparingly soluble in water of iron, cobalt, nickel, ruthenium, rhodium, palladium, iridium, platinum, copper, gold and tungsten.

77. A process according to claim 76 wherein the active component of the catalyst in the step (ii) for liquid phase oxidation comprises at least one of oxides of iron, cobalt, nickel, ruthenium, rhodium, palladium, iridium, platinum, copper, gold and tungsten.

78. A process according to claim 76 wherein the active component of the catalyst in the step (ii) for liquid phase oxidation comprises at least one of ruthenium dichloride, platinum dichloride, ruthenium sulfide and rhodium sulfide.

79. A process according to claim 68 wherein the reaction temperature in the step (ii) for liquid phase oxidation is in the range of about 100° to about 370° C.

80. A process according to claim 79 wherein the reaction temperature in the step (ii) for liquid phase oxidation is in the range of about 200° to about 300° C.

81. A process for treating waste water by wet oxidations which contains at least two kinds of components among suspended solids, ammonia and COD components, the process comprising the steps of;
  (i) subjecting waste water to liquid phase oxidation in the presence of a honeycomb structure and an oxygen-containing gas,
  (ii) subjecting the water from the step (i) to liquid phase oxidation in the presence of an oxygen-containing gas and a catalyst supported by a carrier of honeycomb construction and comprising at least one of iron, cobalt, nickel, ruthenium, rhodium, palladium, iridium, platinum, copper, gold, tungsten and compounds thereof insoluble or sparingly soluble in water, and
  (iii) subjecting the water from the step (ii) to liquid phase oxidation in the presence of an oxygen-containing gas and a catalyst supported by a granular carrier and comprising at least one of iron, cobalt, nickel, ruthenium, rhodium, palladium, iridium, platinum, copper, gold, tungsten and compounds thereof insoluble or sparingly soluble in water.

82. A process according to claim 81 wherein the oxygen-containing gas is used in an amount corresponding to about 1 to about 1.5 times the theoretical amount of oxygen required for the oxidation of the suspended solids, ammonia and COD components to nitrogen, $CO_2$ and water.

83. A process according to claim 82 wherein the oxygen-containing gas is used in an amount corresponding to about 1.05 to about 1.2 times the theoretical oxygen amount.

84. A process according to claim 81 wherein the reaction temperature in the step (i) for liquid phase oxidation is in the range of about 100° to about 370° C.

85. A process according to claim 84 wherein the reaction temperature in the step (i) for liquid phase oxidation is in the range of about 200° to about 300° C.

86. A process according to claim 81 wherein the honeycomb structure used in the step (i) for liquid phase oxidation is about 200 to about 800 $m^2/m^3$ in area per unit volume and about 40 to about 80% in aperture ratio.

87. A process according to claim 81 wherein the carrier of honeycomb construction used in the step (ii) for liquid phase oxidation is about 200 to about 800 $m^2/m^3$ in area per unit volume and about 40 to about 80% in aperture ratio.

88. A process according to claim 81 wherein the active component of the catalyst in the step (ii) for liquid phase oxidation comprises at least one of iron, cobalt, nickel, ruthenium, rhodium, palladium, iridium, platinum, copper, gold and tungsten.

89. A process according to claim 81 wherein the active component of the catalyst in the step (ii) for liquid phase oxidation comprises at least one of compounds insoluble or sparingly soluble in water of iron, cobalt, nickel, ruthenium, rhodium, palladium, iridium, platinum, copper, gold and tungsten.

90. A process according to claim 89 wherein the active component of the catalyst in the step (ii) for liquid phase oxidation comprises at least one of oxides of iron, cobalt, nickel, ruthenium, rhodium, palladium, iridium, platinum, copper, gold and tungsten.

91. A process according to claim 89 wherein the active component of the catalyst in the step (ii) for liquid phase oxidation comprises at least one of ruthenium dichloride, platinum dichloride, ruthenium sulfide and rhodium sulfide.

92. A process according to claim 81 wherein the reaction temperature in the step (ii) for liquid phase oxidation is in the range of about 100° to about 300° C.

93. A process according to claim 92 wherein the reaction temperature in the step (ii) for liquid phase oxidation is in the range of about 200° to about 290° C.

94. A process according to claim 81 wherein the active component of the catalyst in the step (iii) for liquid phase oxidation comprises at least one of iron, cobalt, nickel, ruthenium, rhodium, palladium, iridium, platinum, copper, gold and tungsten.

95. A process according to claim 81 wherein the active component of the catalyst in the step (iii) for liquid phase oxidation comprises at least one of compounds insoluble or sparingly soluble in water of iron, cobalt, nickel, ruthenium, rhodium, palladium, iridium, platinum, copper, gold and tungsten.

96. A process according to claim 95 wherein the active component of the catalyst in the step (iii) for liquid phase oxidation comprises at least one of oxides of iron, cobalt, nickel, ruthenium, rhodium, palladium, iridium, platinum, copper, gold and tungsten.

97. A process according to claim 95 wherein the active component of the catalyst in the step (iii) for liquid phase oxidation comprises at least one of ruthenium dichloride, platinum dichloride, ruthenium sulfide and rhodium sulfide.

98. A process according to claim 81 wherein the reaction temperature in the step (iii) for liquid phase oxidation is in the range of about 100° to about 300° C.

99. A process according to claim 100 wherein the reaction temperature in the step (iii) for liquid phase oxidation is in the range of about 200° to about 290° C.

100. A process for treating waste water by wet oxidations which contains at least two kinds of components among suspended solids, ammonia and COD components, the process comprising the steps of;
(i) subjecting waste water to liquid phase oxidation in the presence of an oxygen-containing gas and a catalyst supported by a carrier of honeycomb construction and comprising at least one of iron, cobalt, nickel, ruthenium, rhodium, palladium, iridium, platinum, copper, gold, tungsten and compounds thereof insoluble or sparingly soluble in water, and
(ii) subjecting the water from the step (i) to liquid phase oxidation in the presence of an oxygen-containing gas and a catalyst supported by a granular carrier and comprising at least one of iron, cobalt, nickel, ruthenium, rhodium, palladium, iridium, platinum, copper, gold, tungsten and compounds thereof insoluble or sparingly soluble in water.

101. A process according to claim 100 wherein the oxygen-containing gas is used in an amount corresponding to about 1 to about 1.5 times the theoretical amount of oxygen required for the oxidation of the suspended solids, ammonia and COD components to nitrogen, $CO_2$ and water.

102. A process according to claim 101 wherein the oxygen-containing gas is used in an amount corresponding to about 1.05 to about 1.2 times the theoretical oxygen amount.

103. A process according to claim 100 wherein the reaction temperature in the step (i) for liquid phase oxidation is in the range of about 100° to about 370° C.

104. A process according to claim 103 wherein the reaction temperature in the step (i) for liquid phase oxidation is in the range of about 200° to about 300° C.

105. A process according to claim 100 wherein the carrier of honeycomb construction used in the step (i) for liquid phase oxidation is about 200 to about 800 $m^2/m^3$ in area per unit volume and about 40 to about 80% in aperture ratio.

106. A process according to claim 100 wherein the active component of the catalyst in the step (i) for liquid phase oxidation comprises at least one of iron, cobalt, nickel, ruthenium, rhodium, palladium, iridium, platinum, copper, gold and tungsten.

107. A process according to claim 100 wherein the active component of the catalyst in the step (i) for liquid phase oxidation comprises at least one of compounds insoluble or sparingly soluble in water of iron, cobalt, nickel, ruthenium, rhodium, palladium, iridium, platinum, copper, gold and tungsten.

108. A process according to claim 107 wherein the active component of the catalyst in the step (i) for liquid phase oxidation comprises at least one of oxides of iron, cobalt, nickel, ruthenium, rhodium, palladium, iridium, platinum, copper, gold and tungsten.

109. A process according to claim 107 wherein the active component of the catalyst in the step (i) for liquid phase oxidation comprises at least one of ruthenium dichloride, platinum dichloride, ruthenium sulfide and rhodium sulfide.

110. A process according to claim 100 wherein the active component of the catalyst in the step (ii) for liquid phase oxidation comprises at least one of iron, cobalt, nickel, ruthenium, rhodium, palladium, iridium, platinum, copper, gold and tungsten.

111. A process according to claim 100 wherein the active component of the catalyst in the step (ii) for liquid phase oxidation comprises at least one of compounds insoluble or sparingly soluble in water of iron, cobalt, nickel, ruthenium, rhodium, palladium, iridium, platinum, copper, gold and tungsten.

112. A process according to claim 111 wherein the active component of the catalyst in the step (ii) for liquid phase oxidation comprises at least one of oxides of iron, cobalt, nickel, ruthenium, rhodium, palladium, iridium, platinum, copper, gold and tungsten.

113. A process according to claim 111 wherein the active component of the catalyst in the step (ii) for liquid phase oxidation comprises at least one of ruthenium dichloride, platinum dichloride, ruthenium sulfide and rhodium sulfide.

114. A process according to claim 100 wherein the reaction temperature in the step (ii) for liquid phase oxidation is in the range of about 100° to about 300° C.

115. A process according to claim 114 wherein the reaction temperature in the step (ii) for liquid phase oxidation is in the range of about 200° to about 290° C.

* * * * *